(12) United States Patent
Kim et al.

(10) Patent No.: US 12,231,271 B2
(45) Date of Patent: Feb. 18, 2025

(54) ELECTRONIC DEVICE AND OPERATION METHOD THEREFOR

(71) Applicant: SAMSUNG ELECTRONICS CO., LTD., Suwon-si (KR)

(72) Inventors: Duckjin Kim, Suwon-si (KR); Cheolho Lee, Suwon-si (KR); Seungjoon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 18/221,717

(22) Filed: Jul. 13, 2023

(65) Prior Publication Data

US 2023/0362043 A1    Nov. 9, 2023

Related U.S. Application Data

(63) Continuation of application No. PCT/KR2022/000288, filed on Jan. 7, 2022.

(30) Foreign Application Priority Data

Jan. 13, 2021    (KR) .......................... 10-2021-0004595

(51) Int. Cl.
*H04L 27/00*    (2006.01)
*H04L 5/00*    (2006.01)
*H04W 72/0453*    (2023.01)

(52) U.S. Cl.
CPC ........ *H04L 27/0014* (2013.01); *H04L 5/0053* (2013.01); *H04W 72/0453* (2013.01); *H04L 2027/0048* (2013.01)

(58) Field of Classification Search
CPC .. H04B 15/02; H04B 1/707; H04B 2215/064; H04L 27/0014; H04L 5/0053; H04L 2027/0048; H04W 72/0453
See application file for complete search history.

(56) References Cited

U.S. PATENT DOCUMENTS 6,564,040 B1    5/2003   Fujiwara
7,590,163 B1 *  9/2009   Miller .................... H04B 15/02
                                                              375/376

(Continued)

FOREIGN PATENT DOCUMENTS

JP          4119696 B2    7/2008
JP       2008-301482 A   12/2008

(Continued)

OTHER PUBLICATIONS

Written Opinion (PCT/ISA/237) issued Apr. 13, 2022 from the International Searching Authority in International Application No. PCT/KR2022/000288.

(Continued)

*Primary Examiner* — Dac V Ha
(74) *Attorney, Agent, or Firm* — Sughrue Mion, PLLC

(57) ABSTRACT

An electronic device includes: An electronic device includes a first communication module and a second communication module configured to perform wireless communication, a spread spectrum clock generator (SSCG), a memory, and a processor. The processor is configured to execute instructions to set a spread spectrum method and a spread ratio of the SSCG, determine whether the electronic device is communicatively coupled to at least one of a first and a second wireless communication, identify a frequency band of a channel of the at least one of the first and the second wireless communication, determine whether at least one of a frequency and multiplication frequencies of the frequency is included by the frequency band of the channel, and maintain the spread spectrum method and the spread ratio causing the SSCG to generate a spread spectrum clock signal based on first spread spectrum method and the spread ratio.

20 Claims, 12 Drawing Sheets

(56) References Cited

U.S. PATENT DOCUMENTS

| | | | |
|---|---|---|---|
| 7,643,534 B2* | 1/2010 | Kusumi | H04B 15/02 |
| | | | 713/600 |
| 7,864,725 B2 | 1/2011 | Li et al. | |
| 8,638,147 B2* | 1/2014 | Matsuda | H03L 7/148 |
| | | | 327/158 |
| 8,799,700 B2 | 8/2014 | Arumugham et al. | |
| 9,048,851 B2 | 6/2015 | Schrom et al. | |
| 9,238,580 B2 | 1/2016 | Alagarsamy et al. | |
| 2001/0011027 A1 | 8/2001 | Matsuura et al. | |
| 2008/0276113 A1 | 11/2008 | Tabeta | |
| 2012/0218017 A1 | 8/2012 | Roy | |
| 2015/0340013 A1 | 11/2015 | Lee et al. | |
| 2019/0173454 A1* | 6/2019 | Jun | H03L 7/0802 |
| 2020/0112331 A1 | 4/2020 | Shimura et al. | |

FOREIGN PATENT DOCUMENTS

| | | | |
|---|---|---|---|
| JP | 2011-135262 A | 7/2011 | |
| JP | 6396675 B2 | 9/2018 | |
| JP | 6556889 B2 | 8/2019 | |
| KR | 10-0792042 B1 | 1/2008 | |
| KR | 10-1105690 B1 | 1/2012 | |
| KR | 10-1135872 B1 | 4/2012 | |
| KR | 10-2015-0134484 A | 12/2015 | |
| KR | 10-2019-0067053 A | 6/2019 | |
| KR | 10-2371668 B1 | 3/2022 | |
| WO | 2010-096910 A1 | 9/2010 | |
| WO | 2012/117531 A1 | 9/2012 | |

OTHER PUBLICATIONS

International Search Report (PCT/ISA/210) issued Apr. 13, 2022 from the International Searching Authority in International Application No. PCT/KR2022/000288.

* cited by examiner

| Data communication | Spread spectrum method | Spread ratio | Operating frequency range | Overlapping Wi-Fi/ RF Channel |
|---|---|---|---|---|
| SDIO (fc = 200Mhz) | 1(Center Spread) | 11 (2%) | 198Mhz~202Mhz | WiFi 2.4Ghz Band Channel 1 |
| | | 10 (1.5%) | 198.5Mhz~201.5Mhz | WiFi 2.4Ghz Band Channel 1 |
| | | 01 (1%) | 199Mhz~201Mhz | WiFi 2.4Ghz Band Channel 1 |
| | | 00 (0.5%) | 199.5Mhz~200.5Mhz | LTE Band 23 |
| | 0(Down Spread) | 11 (2%) | 196Mhz~200Mhz | LTE Band 23 |
| | | 10 (1.5%) | 197Mhz~200Mhz | LTE Band 23 |
| | | 01 (1%) | 198Mhz~200Mhz | LTE Band 23 |
| | | 00 (0.5%) | 199Mhz~200Mhz | LTE Band 23 |

FIG. 8

ELECTRONIC DEVICE AND OPERATION METHOD THEREFOR

CROSS-REFERENCE TO RELATED APPLICATIONS

This application is a continuation application of International Application No. PCT/KR2022/000288, filed on Jan. 7, 2022, which claims priority to Korean Patent Application No. 10-2021-0004595, filed on Jan. 13, 2021, in the Korean Intellectual Property Office, the disclosures of which are incorporated by reference herein in their entireties.

BACKGROUND

1. Field

The disclosure relates to an electronic device with a spread spectrum clock generator and an operation method thereof.

2. Description of Related Art

A spread spectrum clock generation (SSCG) technology may be used as a possible technique for attempting to reduce electromagnetic interference (EMI) phenomena in an electronic device. For example, SSCG may be used to potentially reduce a peak power of the electronic device by varying an operating frequency of the electronic device over time. As such, the profile of frequency varying over time may be an important factor in determining the amount of peak power reduction.

SUMMARY

Provided is an electronic device that controls a spread spectrum clock generator to output a clock signal that potentially reduces electromagnetic interference (EMI) without deteriorating a performance of connected communications by changing a spread spectrum setting.

According to an aspect of the disclosure, an electronic device includes: a first communication module configured to perform first wireless communication; a second communication module configured to perform second wireless communication; a spread spectrum clock generator (SSCG) configured to generate a first spread spectrum clock signal for data communication of the electronic device; a memory storing instructions; and a processor operatively coupled to the memory, wherein the processor is configured to execute the instructions to: based on a communication state change event of the electronic device occurring, set a spread spectrum method of the SSCG to a first spread spectrum method, set a spread ratio of the SSCG to a first spread ratio, and determine whether the electronic device is communicatively coupled to at least one of the first wireless communication and the second wireless communication, based on the electronic device being communicatively coupled to the at least one of the first wireless communication and the second wireless communication, identify a frequency band of a channel of the at least one of the first wireless communication and the second wireless communication communicatively coupled to the electronic device, and determine whether at least one of a first frequency of a first operating frequency range and first multiplication frequencies of the first frequency is in the frequency band of the channel, and based on the first frequency and the first multiplication frequencies of the first frequency being outside the frequency band, maintain the first spread spectrum method and the first spread ratio causing the SSCG to generate the first spread spectrum clock signal based on the first spread spectrum method and the first spread ratio, wherein the first operating frequency range is determined based on a center frequency of the first spread spectrum clock signal, the first spread spectrum method, and the first spread ratio.

The processor may be further configured to execute the instructions to: based on at least one of the first frequency and the first multiplication frequencies of the first frequency being in the frequency band of the channel, change the spread spectrum method of the SSCG to a second spread spectrum method and determine whether at least one of a second frequency of a second operating frequency range and second multiplication frequencies of the second frequency is in the frequency band of the channel, and the second operating frequency range may be determined based on the center frequency of the first spread spectrum clock signal, the second spread spectrum method, and the first spread ratio.

The processor may be further configured to execute the instructions to maintain the second spread spectrum method and the first spread ratio based on the second frequency and the second multiplication frequencies of the second frequency being outside of the frequency band, and the SSCG may be further configured to generate a second spread spectrum clock signal based on the second spread spectrum method and the first spread ratio.

The processor may be further configured to execute the instructions to: based on the at least one of the second frequency and the second multiplication frequencies of the second frequency being in the frequency band, determine whether the first spread ratio is a minimum spread ratio, and based on the first spread ratio being greater than the minimum spread ratio, change the spread spectrum method of the SSCG to the first spread spectrum method and change the spread ratio of the SSCG to a second spread ratio.

The processor may be further configured to execute the instructions to: determine whether at least one of a third frequency of a third operating frequency range and third multiplication frequencies of the third frequency is in the frequency band, and the third operating frequency range is determined based on the center frequency of the first spread spectrum clock signal, the first spread spectrum method, and the second spread ratio.

The processor may be further configured to execute the instructions to: based on the at least one of the third frequency and the third multiplication frequencies of the third frequency being in the frequency band, change the spread spectrum method of the SSCG to the second spread spectrum method and determine whether at least one of a fourth frequency of a fourth operating frequency range and fourth multiplication frequencies of the fourth frequency is in the frequency band, and the fourth operating frequency range is determined based on the center frequency of the first spread spectrum clock signal, the second spread spectrum method, and the second spread ratio.

The processor may be further configured to execute the instructions to set a first bit value corresponding to the first spread spectrum method and a second bit value corresponding to the first spread ratio in a first register of the SSCG.

The first wireless communication may be wireless fidelity (Wi-Fi) communication, and the second wireless communication may be radio frequency (RF) communication.

The first spread spectrum method may be a center-spread spectrum method.

According to an aspect of the disclosure, a method of operating an electronic device, includes: based on a communication state change event of the electronic device occurring, setting a spread spectrum method of a spread spectrum clock generator (SSCG) of the electronic device to a first spread spectrum method and setting a spread ratio of the SSCG to a first spread ratio; determining whether the electronic device is communicatively coupled to at least one of a first wireless communication and a second wireless communication; based on the electronic device being communicatively coupled to the at least one of the first wireless communication and the second wireless communication, identifying a frequency band of a channel of the at least one of the first wireless communication and the second wireless communication communicatively coupled to the electronic device; determining whether at least one of a first frequency of a first operating frequency range and first multiplication frequencies of the first frequency is in the frequency band of the channel; and based on the first frequency and the first multiplication frequencies of the first frequency being outside of the frequency band, maintaining the first spread spectrum method and the first spread ratio so that the SSCG generates a first spread spectrum clock signal based on the first spread spectrum method and the first spread ratio, wherein the first operating frequency range is determined based on a center frequency of the first spread spectrum clock signal, the first spread spectrum method, and the first spread ratio.

The method may further include, based on at least one of the first frequency and the first multiplication frequencies of the first frequency being in the frequency band of the channel, changing the spread spectrum method of the SSCG to a second spread spectrum method, and determining whether at least one of a second frequency of a second operating frequency range and second multiplication frequencies of the second frequency is in the frequency band, and the second operating frequency range may be determined based on the center frequency of the first spread spectrum clock signal, the second spread spectrum method, and the first spread ratio.

The method may further include, based on the second frequency and the second multiplication frequencies of the second frequency being outside the frequency band, maintaining the second spread spectrum method and the first spread ratio so that the SSCG generates a second spread spectrum clock signal based on the second spread spectrum method and the first spread ratio.

The method may further include: based on the at least one of the second frequency and the second multiplication frequencies of the second frequency being in the frequency band, determining whether the first spread ratio is a minimum spread ratio; and based on the first spread ratio being greater than the minimum spread ratio, changing the spread spectrum method of the SSCG to the first spread spectrum method and changing the spread ratio of the SSCG to a second spread ratio.

The method may further include determining whether at least one of a third frequency of a third operating frequency range and third multiplication frequencies of the third frequency is in the frequency band, and the third operating frequency range may be determined based on the center frequency of the first spread spectrum clock signal, the first spread spectrum method, and the second spread ratio.

The method may further include: based on the at least one of the third frequency and the third multiplication frequencies of the third frequency being in the frequency band, changing the spread spectrum method of the SSCG to the second spread spectrum method and determining whether at least one of a fourth frequency of a fourth operating frequency range and fourth multiplication frequencies of the fourth frequency is in the frequency band, and the fourth operating frequency range is determined based on the center frequency of the first spread spectrum clock signal, the second spread spectrum method, and the second spread ratio.

The method may further include: setting a first bit value corresponding to the first spread spectrum method and setting a second bit value corresponding to the first spread ratio in a first register of the SSCG.

The first wireless communication may be wireless fidelity (Wi-Fi) communication, and the second wireless communication may be radio frequency (RF) communication.

The first spread spectrum method may be a center-spread spectrum method.

According to an aspect of the disclosure, a non-transitory computer-readable storage medium stores computer-executable instructions for performing data communication that, when executed by at least one processor of an electronic device, cause the electronic device to: based on a communication state change event of the electronic device occurring, set a spread spectrum method of a spread spectrum clock generator (SSCG) of the electronic device to a first spread spectrum method and set a spread ratio of the SSCG to a first spread ratio; determine whether the electronic device is communicatively coupled to at least one of a first wireless communication and a second wireless communication; based on the electronic device being communicatively coupled to the at least one of the first wireless communication and the second wireless communication, identify a frequency band of a channel of the at least one of the first wireless communication and the second wireless communication communicatively coupled to the electronic device; determine whether at least one of a first frequency of a first operating frequency range and first multiplication frequencies of the first frequency is in the frequency band of the channel; and based on the first frequency and the first multiplication frequencies of the first frequency being outside of the frequency band, maintain the first spread spectrum method and the first spread ratio so that the SSCG generates a first spread spectrum clock signal based on the first spread spectrum method and the first spread ratio, wherein the first operating frequency range is determined based on a center frequency of the first spread spectrum clock signal, the first spread spectrum method, and the first spread ratio.

The computer-executable instructions, when executed by the at least one processor, may further cause the electronic device to: based on at least one of the first frequency and the first multiplication frequencies of the first frequency being in the frequency band of the channel, change the spread spectrum method of the SSCG to a second spread spectrum method, and determine whether at least one of a second frequency of a second operating frequency range and second multiplication frequencies of the second frequency is in the frequency band, and the second operating frequency range is determined based on the center frequency of the first spread spectrum clock signal, the second spread spectrum method, and the first spread ratio.

According to one or more embodiments, performance degradation of connected communications may be prevented by controlling an SSCG.

According to one or more embodiments, EMI may be reduced by controlling an SSCG.

BRIEF DESCRIPTION OF THE DRAWINGS

The above and other aspects, features, and advantages of certain embodiments of the present disclosure may be more apparent from the following description taken in conjunction with the accompanying drawings, in which:

FIGS. 6 to 11 are diagrams illustrating an operation of an electronic device, according to various embodiments.

Hereinafter, example embodiments are described with reference to the accompanying drawings. When describing the embodiments with reference to the accompanying drawings, like reference numerals refer to like elements and a repeated description related thereto may be omitted.

FIG. 1 is a block diagram illustrating an electronic device 101 in a network environment 100, according to various embodiments. Referring to FIG. 1, the electronic device 101 in the network environment 100 may communicate with an electronic device 102 via a first network 198 (e.g., a short-range wireless communication network), and/or may communicate with at least one of an electronic device 104 and a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and an antenna module 197. The number and arrangement of components of the electronic device 101 shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may be integrated with each other, and/or may be implemented as an integrated circuit, as software, and/or a combination of circuits and software. For example, in some embodiments, at least one (e.g., the connecting terminal 178) of the above components may be omitted from the electronic device 101, or one or more other components may be added in the electronic device 101. For another example, in some embodiments, some (e.g., the sensor module 176, the camera module 180, or the antenna module 197) of the components may be integrated as a single component (e.g., the display module 160).

Figure 1:
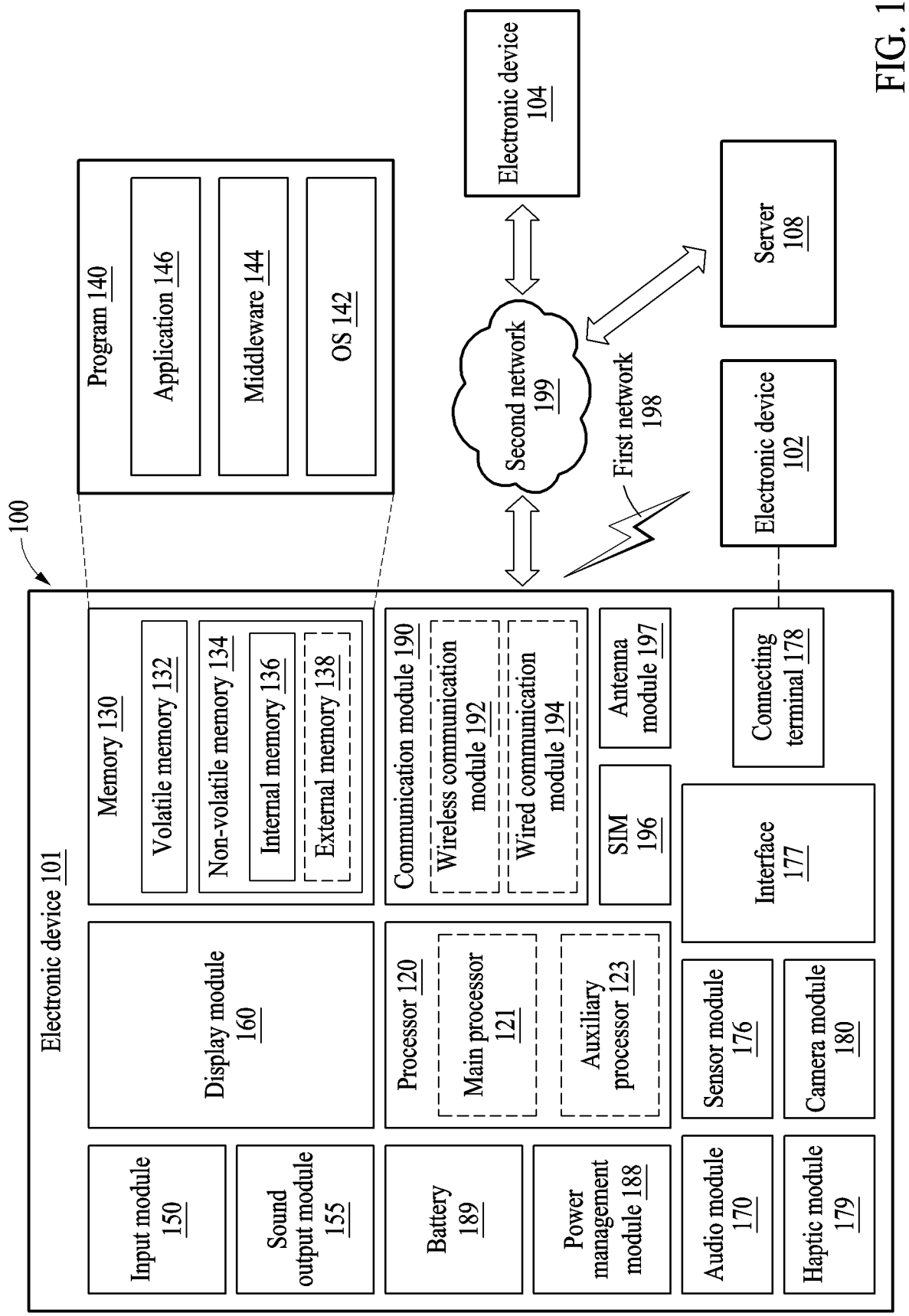
FIG. 1 is a block diagram illustrating an electronic device in a network environment, according to one or more embodiments.

The processor 120 may execute, for example, software (e.g., a program 140) to control at least one other component (e.g., a hardware or software component) of the electronic device 101 connected to the processor 120, and may perform various data processing and/or computations. According to an embodiment, as at least a part of data processing and/or computations, the processor 120 may store a command and/or data received from another component (e.g., the sensor module 176 or the communication module 190) in a volatile memory 132, process the command and/or the data stored in the volatile memory 132, and store resulting data in a non-volatile memory 134. According to an embodiment, the processor 120 may include a main processor 121 (e.g., a central processing unit (CPU), an application processor (AP), or the like) and/or an auxiliary processor 123 (e.g., a graphics processing unit (GPU), a neural processing unit (NPU), an image signal processor (ISP), a sensor hub processor, a communication processor (CP), or the like) that may be operable independently from, and/or in conjunction with, the main processor 121. For example, when the electronic device 101 includes the main processor 121 and the auxiliary processor 123, the auxiliary processor 123 may be adapted to consume less power than the main processor 121 and/or to perform a specified function. Alternatively or additionally, the auxiliary processor 123 may be implemented as separate from, and/or as part of, the main processor 121.

The auxiliary processor 123 may control at least some of functions and/or states related to at least one of the components (e.g., the display module 160, the sensor module 176, the communication module 190, and the like) of the electronic device 101, instead of the main processor 121, while the main processor 121 may be in an inactive (e.g., sleep) state, and/or together (e.g., in conjunction) with the main processor 121, while the main processor 121 is in an active state (e.g., executing an application). According to an embodiment, the auxiliary processor 123 (e.g., an ISP, a CP) may be implemented as part of another component (e.g., the camera module 180, the communication module 190) that may be functionally related to the auxiliary processor 123. According to an embodiment, the auxiliary processor 123 (e.g., an NPU) may include a hardware structure specified for artificial intelligence (AI) model processing. An AI model may be generated through machine learning. Such learning may be performed, for example, by the electronic device 101 in which an AI model may be executed, and/or via a separate server (e.g., the server 108). Learning algorithms may include, but may not be limited to, for example, supervised learning, unsupervised learning, semi-supervised learning, and reinforcement learning. The AI model may include a plurality of artificial neural network layers. An artificial neural network may be and/or may include, but not be limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, and/or a combination thereof. Alternatively or additionally, the AI model may include a software structure other than the hardware structure.

The memory 130 may store various pieces of data used by at least one component (e.g., the processor 120, the sensor module 176) of the electronic device 101. The various pieces of data may include, but not be limited to, for example, software (e.g., the program 140), and input data and/or output data for a command related thereto. The memory 130 may include the volatile memory 132 and/or the non-volatile memory 134.

The program 140 may be stored as software in the memory 130 and may include, but not be limited to, for example, an operating system (OS) 142, middleware 144, and/or an application 146.

The input module 150 may receive a command and/or data to be used by another component (e.g., the processor 120) of the electronic device 101, from the outside (e.g., a user) of the electronic device 101. The input module 150 may include, but not be limited to, for example, a microphone, a mouse, a keyboard, a key (e.g., a button), a digital pen (e.g., a stylus pen), a joy stick, a track ball, a graphic tablet, a haptic glove, a virtual reality (VR) glove, and the like.

The sound output module 155 may output a sound signal to the outside of the electronic device 101. The sound output module 155 may include, but not be limited to, for example, a speaker and a receiver. The speaker may be used for general purposes, such as playing multimedia content and/or playing audio content. The receiver may be used to receive an incoming call. According to an embodiment, the receiver may be implemented as separate from, and/or as part of, the speaker.

The display module 160 may visually provide information to the outside (e.g., a user) of the electronic device 101. The display module 160 may include, but not be limited to, for example, a display, a hologram device, a projector and/or control circuitry to control a corresponding one of the display, hologram device, and projector. According to an embodiment, the display module 160 may include a touch sensor adapted to sense a touch, or a pressure sensor adapted to measure the intensity of force incurred by the touch.

The audio module 170 may convert a sound into an electrical signal and/or convert an electrical signal into a sound. According to an embodiment, the audio module 170 may obtain the sound via the input module 150 and/or output the sound via the sound output module 155 and/or an external electronic device (e.g., the electronic device 102 such as a speaker and/or headphones) directly (e.g., wired) or wirelessly connected to the electronic device 101.

The sensor module 176 may detect an operational state (e.g., power, temperature) of the electronic device 101 and/or an environmental state (e.g., a state of a user) external to the electronic device 101, and generate an electrical signal and/or data value corresponding to the detected state. According to an embodiment, the sensor module 176 may include, but not be limited to, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support (e.g., conform to) one or more specified protocols that may be used by the electronic device 101 to communicatively couple with the external electronic device (e.g., the electronic device 102) directly (e.g., by wire) and/or wirelessly. According to an embodiment, the interface 177 may include, but not be limited to, for example, a high-definition multimedia interface (HDMI), a universal serial bus (USB) interface, a secure digital (SD) card interface, an audio interface, and the like.

The connecting terminal 178 may include a connector via which the electronic device 101 may be physically connected to the external electronic device (e.g., the electronic device 102). According to an embodiment, the connecting terminal 178 may include, but not be limited to, for example, an HDMI connector, a USB connector, an SD card connector, an audio connector (e.g., a headphone connector), and the like.

The haptic module 179 may convert an electrical signal into a mechanical stimulus (e.g., a vibration and/or a movement) and/or an electrical stimulus which may be recognized by a user via their tactile sensation and/or kinesthetic sensation. According to an embodiment, the haptic module 179 may include, but not be limited to, for example, a motor, a piezoelectric element, an electric stimulator, and the like.

The camera module 180 may capture a still image and/or moving images. According to an embodiment, the camera module 180 may include, but not be limited to, one or more lenses, image sensors, ISPs, flashes, and the like.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, but note be limited to, for example, a primary cell which may not be rechargeable, a secondary cell which may be rechargeable, a fuel cell, and the like.

The communication module 190 may support establishing a direct (e.g., wired) communication channel and/or a wireless communication channel between the electronic device 101 and the external electronic device (e.g., the electronic device 102, the electronic device 104, the server 108) and performing communication via the established communication channel. The communication module 190 may include one or more CPs that may be operable independently of the processor 120 (e.g., an AP) and that may support a direct (e.g., wired) communication and/or a wireless communication. According to an embodiment, the communication module 190 may include a wireless communication module 192 (e.g., a cellular communication module, a short-range wireless communication module, a global navigation satellite system (GNSS) communication module, and the like) and/or a wired communication module 194 (e.g., a local area network (LAN) communication module, a power line communication (PLC) module, and the like). A corresponding one of these communication modules may communicate with the external electronic device 104 via the first network 198 (e.g., a short-range communication network, such as Bluetooth™, Institute of Electrical and Electronics Engineers (IEEE) 802.11x (e.g., wireless-fidelity (Wi-Fi)), Wi-Fi direct, or infrared data association (IrDA)) and/or the second network 199 (e.g., a long-range communication network, such as, but not limited to, a legacy cellular network, a third generation (3G) network, a fourth generation (4G) network, a long term evolution (LTE) network, a fifth generation (5G) network, a next-generation communication network (5G NR), the Internet, or a computer network (e.g., a LAN or a wide area network (WAN)).

These various types of communication modules may be implemented as a single component (e.g., a single chip), and/or may be implemented as multiple components (e.g., multiple chips) separate from each other. The wireless communication module 192 may identify and authenticate the electronic device 101 in a communication network, such as the first network 198 and/or the second network 199, using subscriber information (e.g., international mobile subscriber identity (IMSI)) stored in the SIM 196.

The wireless communication module 192 may support a cellular network, such as, but not limited to, a legacy cellular network, a 3G network, a 4G network, an LTE network, a 5G network, and/or next-generation communication technology (e.g., new radio (NR) access technology). For example, the NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve a high data transmission rate. The wireless communication module 192 may support various technologies for securing performance on a high-frequency band, such as, but not limited to, for example, beamforming, multiple-input and multiple-output (MIMO), massive MIMO, full dimensional MIMO (FD-MIMO), an array antenna, analog beamforming, a large scale antenna, and the like.

The wireless communication module 192 may support various requirements specified in the electronic device 101, an external electronic device (e.g., the electronic device 104), and/or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, and/or U-plane latency (e.g., 0.5 milliseconds (ms) or less for each of downlink (DL) and uplink (UL), or a round trip of 1 ms or less) for implementing URLLC.

The antenna module 197 may transmit and/or receive a signal and/or power to and/or from the outside (e.g., an external electronic device 102) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 and/or the second network 199, may be selected by, for example, the communication module 190 from the plurality of antennas. The signal and/or power may be transmitted and/or received between the communication module 190 and the external electronic device via the at least one selected antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a PCB, an RFIC disposed on a first surface (e.g., the bottom surface) of the PCB and/or adjacent to the first surface and capable of supporting a designated high-frequency band (e.g., the mmWave band), and a plurality of antennas (e.g., array antennas) disposed on a second surface (e.g., the top or a side surface) of the PCB, and/or adjacent to the second surface. The plurality of antennas may be capable of transmitting and/or receiving signals in the designated high-frequency band.

At least some of the above-described components may be coupled mutually and may communicate signals (e.g., commands or data) therebetween via an inter-peripheral communication scheme (e.g., a bus, general purpose input and output (GPIO), serial peripheral interface (SPI), mobile industry processor interface (MIPI), and the like).

According to an embodiment, commands and/or data may be transmitted and/or received between the electronic device 101 and the external electronic device 104 via the server 108 coupled with the second network 199. Each of the external electronic devices 102 and 104 may be and/or may include a device of the same type as and/or a different type from the electronic device 101. According to an embodiment, all or some of operations to be executed at the electronic device 101 may be executed at one or more of external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), and/or client-server computing technology may be used, for example. The electronic device 101 may provide ultra low-latency services using, for example, distributed computing and/or MEC. In an embodiment, the external electronic device 104 may be and/or may include an Internet-of-things (IoT) device. The server 108 may be and/or may include an intelligent server using machine learning and/or a neural network. According to an embodiment, the external electronic device 104 and/or the server 108 may be included in the second network 199. The electronic device 101 may be applied to intelligent services (e.g., a smart home, a smart city, a smart car, or healthcare) based on 5G communication technology and/or IoT-related technology.

The electronic device, according to the embodiments disclosed herein, may be one of various types of electronic devices. The electronic devices may include, but not be limited to, for example, a portable communication device (e.g., a smartphone), a computer device, a portable multimedia device, a portable medical device, a camera, a wearable device, a home appliance, and the like.

It is to be understood that embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B or C", "at least one of A, B and C", and "at least one of A, B, or C", may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively", as "coupled with", "coupled to", "connected with", or "connected to" another component (e.g., a second component), it means that the component may be coupled with the other component directly (e.g., by wire), wirelessly, or via a third component.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" may refer to the storage medium being a tangible device, and may not include a signal (e.g., an electromagnetic wave), but this term does not differentiate between where data may be semi-permanently stored in the storage medium and where the data may be temporarily stored in the storage medium.

According to an embodiment, a method according to various embodiments of the present disclosure may be included and/or may be provided in a computer program product. The computer program product may be traded as a product between a seller and a buyer. The computer program product may be distributed in the form of a machine-readable storage medium (e.g., compact disc read-only memory (CD-ROM)), may be distributed (e.g., downloaded or uploaded) online via an application store (e.g., PlayStore™), and/or may be exchanged between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various embodiments, components described herein (e.g., a module or a program) may include a single entity and/or may include multiple entities. Alternatively or additionally, some of the multiple entities may be separately disposed in different components. According to various embodiments, one or more components and/or operations may be omitted, and/or one or more other components and/or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, and/or heuristically. Alternatively or additionally, one or more of the operations may be executed in a different order or omitted, and/or one or more other operations may be added.

Figure 2:
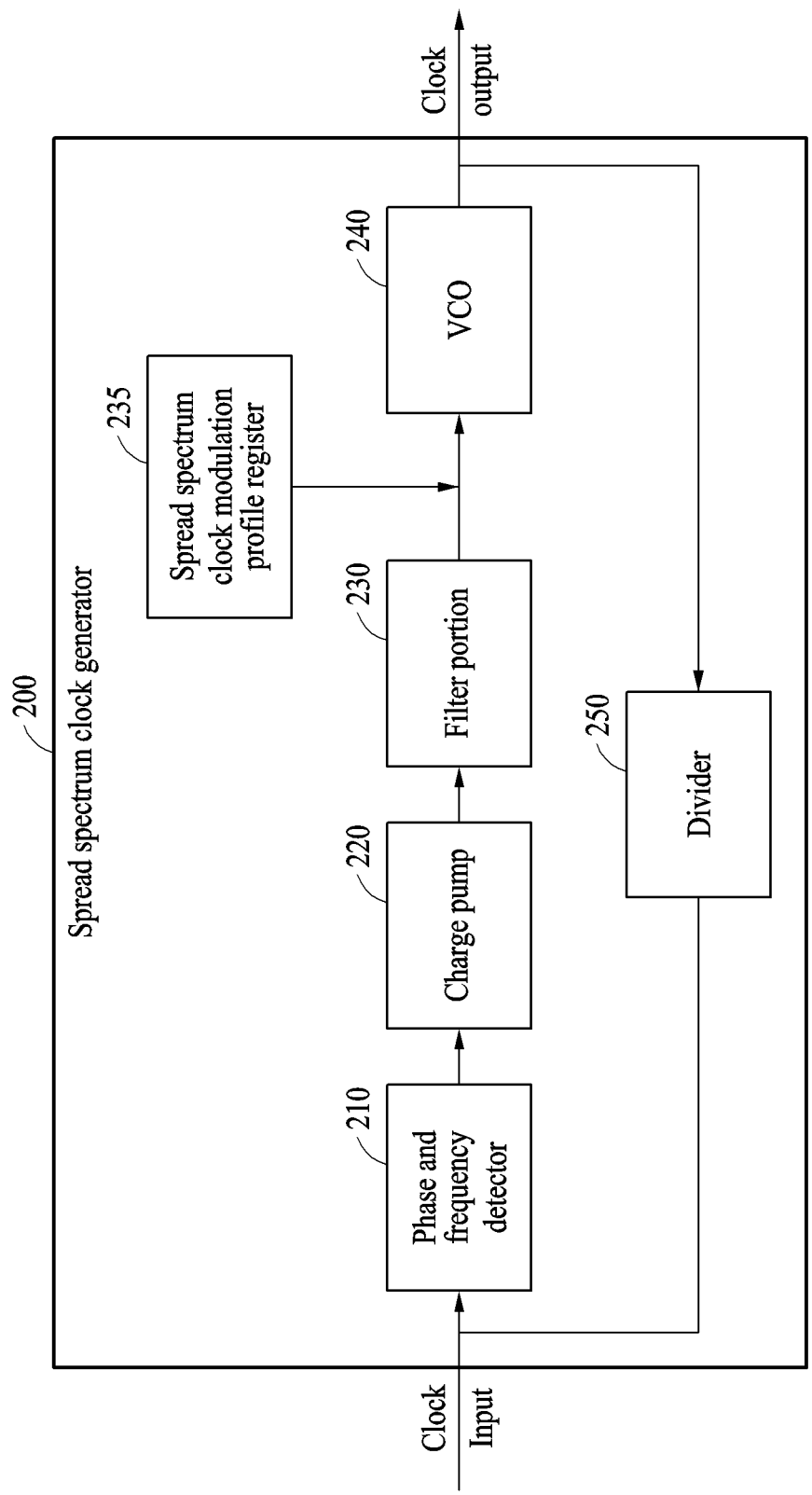
FIG. 2 is a block diagram illustrating a spread spectrum clock generator (SSCG), according to one or more embodiments.

FIG. 2 is a block diagram illustrating a spread spectrum clock generator (SSCG), according to one or more embodiments.

Referring to FIG. 2, an SSCG 200 may include a phase and frequency detector 210, a charge pump 220, a filter portion 230, a spread spectrum clock generation modulation profile register 235, a voltage-controlled oscillator (VCO) 240, and a divider 250.

According to an embodiment, the SSCG 200 may be included in the electronic device 101 of FIG. 1. According to an embodiment, the SSCG 200 may generate a spread spectrum clock signal for data communication of the electronic device 101 of FIG. 1. A communication interface for data communication of the electronic device 101 may include, but not be limited to, for example, a universal serial bus (USB), a peripheral component interconnect express (PCIe), a secure digital input/output (SDIO), a secure digital card (SDC), a mobile industry processor interface (MIPI), and the like. According to an embodiment, the communication interface for data communication of the electronic device 101 may include the interface 177 of FIG. 1.

According to an embodiment, the phase and frequency detector 210 may receive an input clock signal and a feedback signal output from the divider 250. The phase and frequency detector 210 may detect a phase difference and/or a frequency difference between the input clock signal and the feedback signal, respectively. The phase and frequency detector 210 may transmit the detected phase difference and the detected frequency difference to the charge pump 220.

According to an embodiment, the charge pump 220 may provide a voltage based on the detected phase difference and the detected frequency difference to the filter portion 230.

According to an embodiment, the filter portion 230 may filter the provided voltage. For example, the filter portion 230 may perform low-pass filtering on the voltage signal provided by the charge pump 220.

According to an embodiment, the spread spectrum clock generation modulation profile register 235 may store a bit value for a spread spectrum method and/or a bit value for a spread ratio. The spread ratio may refer to a factor determining a spread bandwidth of a spread spectrum clock signal to be output from the VCO 240.

According to an embodiment, in the case of a center-spread spectrum method, the bit value for the spread spectrum method of the spread spectrum clock generation modulation profile register 235 may be, for example, "1" (or one or a value corresponding to a high level). In the case of a down-spread spectrum method, the bit value for the spread spectrum method of the spread spectrum clock generation modulation profile register 235 may be, for example, "0" (or zero or a value corresponding to a low level). However, the present disclosure is not limited in this regard. For example, the bit value for the center-spread spectrum method may be "0" and/or the bit value for the down-spread spectrum method may be "1". Alternatively or additionally, additional bits may be used in order to represent a larger amount of spread spectrum methods (e.g., more than one bit may be used to represent more than two spread spectrum methods).

When a spread ratio is, for example, 2%, the bit value for the spread ratio of the spread spectrum clock generation modulation profile register 235 may be, for example, "11". Alternatively or additionally, when a spread ratio is, for example, 1.5%, the bit value for the spread ratio of the spread spectrum clock generation modulation profile register 235 may be, for example, "10". In another example, when a spread ratio is, for example, 1%, the bit value for the spread ratio of the spread spectrum clock generation modulation profile register 235 may be, for example, "01", and when a spread ratio is, for example, 0.5%, the bit value for the spread ratio of the spread spectrum clock generation modulation profile register 235 may be, for example, "00". However, the present disclosure is not limited in this regard. For example, other bit values may correspond to other spread ratio values and/or to the same spread ratio values. Alternatively or additionally, additional bits may be used in order to represent a larger amount of spread ratio values (e.g., more than two bits may be used to represent more than four spread ratio values).

According to an embodiment, a modulator (not shown) may identify a spread spectrum method to be applied through the bit value for the spread spectrum method. The modulator may identify a spread ratio to be applied through the bit value for the spread ratio. The modulator may modulate a voltage received from the filter portion 230 based on the determined spread spectrum method and the determined spread ratio and may provide the modulated voltage to the VCO 240.

According to an embodiment, the VCO 240 may output the spread spectrum clock signal by performing oscillation according to the modulated voltage.

According to an embodiment, the divider 250 may divide the spread spectrum clock signal output from the VCO 240, generate a feedback signal by dividing the spread spectrum clock signal by a predetermined value, and provide the generated feedback signal to the phase and frequency detector 210.

The number and arrangement of components of the SSCG 200 shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Alternatively or additionally, a set of (one or more) components shown in FIG. 2 may be integrated with each other, and/or may be implemented as an integrated circuit, as software, and/or a combination of circuits and software.

Figure 3:
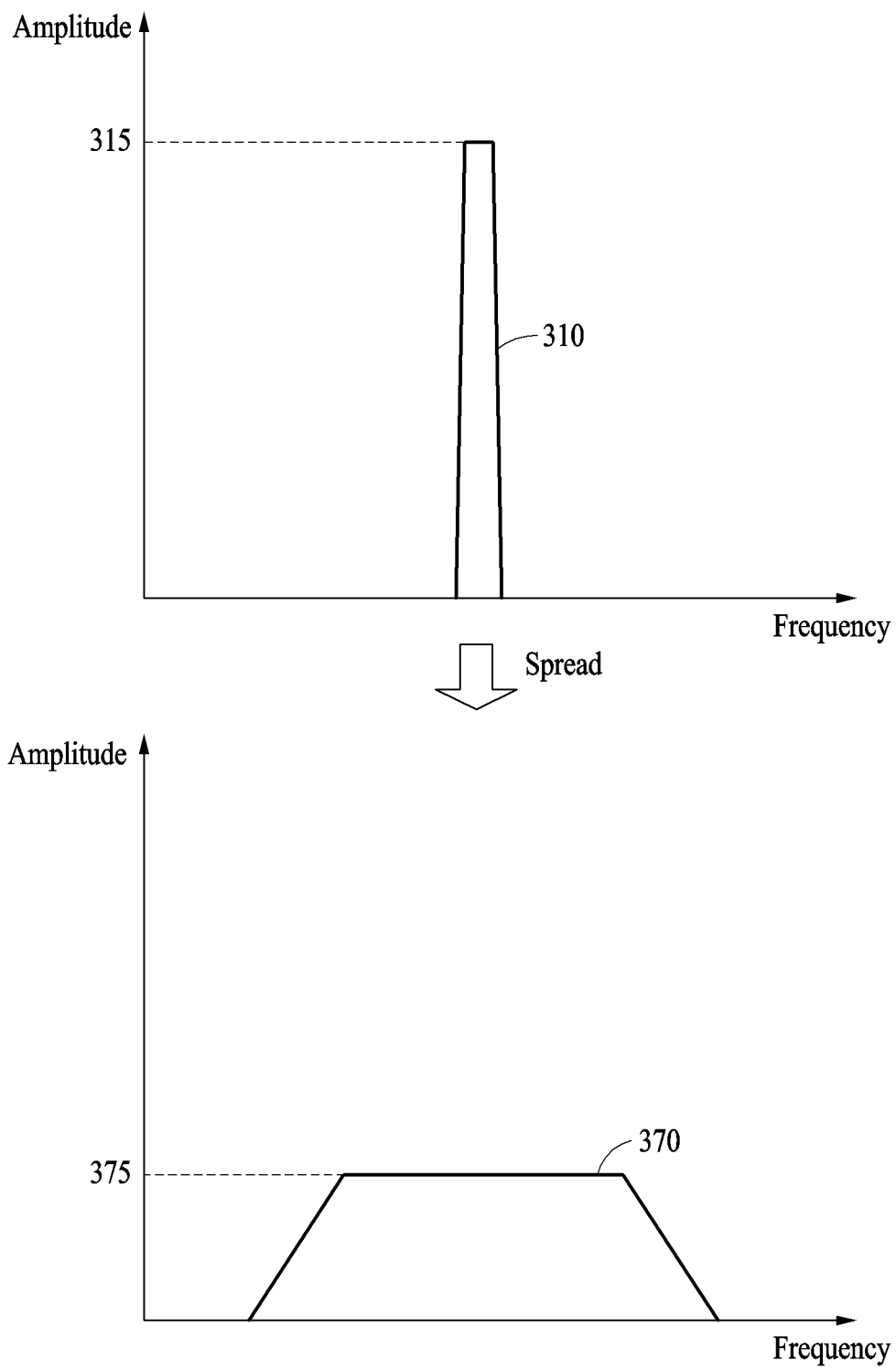
FIG. 3 is a graph illustrating frequency band distributions when a spread spectrum is not used and when a spread spectrum is used, according to various embodiments.

FIG. 3 is a graph illustrating frequency band distributions when a spread spectrum is not used and when a spread spectrum is used, according to various embodiments.

FIG. 3 illustrates an example of a frequency domain signal 310 of a clock signal to which a spread spectrum has not been applied and a frequency domain signal 370 of a spread spectrum clock signal.

According to an embodiment, an area of the frequency domain signal 370 of the spread spectrum clock signal may be substantially the same as and/or may be equal to an area of the frequency domain signal 310 of the clock signal to which the spread spectrum has not been applied. Accordingly, the energy of the frequency domain signal 370 may be substantially the same as and/or may be equal to the energy of the frequency domain signal 310.

According to an embodiment, the frequency bandwidth of the frequency domain signal 370 of the spread spectrum clock signal may be greater than the frequency bandwidth of the frequency domain signal 310 of the clock signal to which the spread spectrum has not been applied. A noise peak value 375 of the frequency domain signal 370 may be less than a noise peak value 315 of the frequency domain signal 310. According to an embodiment, electromagnetic interference (EMI) emitted from an electronic device (e.g., the electronic device 101) may be reduced in an output clock signal to which the spread spectrum has been applied when compared to an output of a clock signal to which the spread spectrum has been not applied.

Figure 4A:
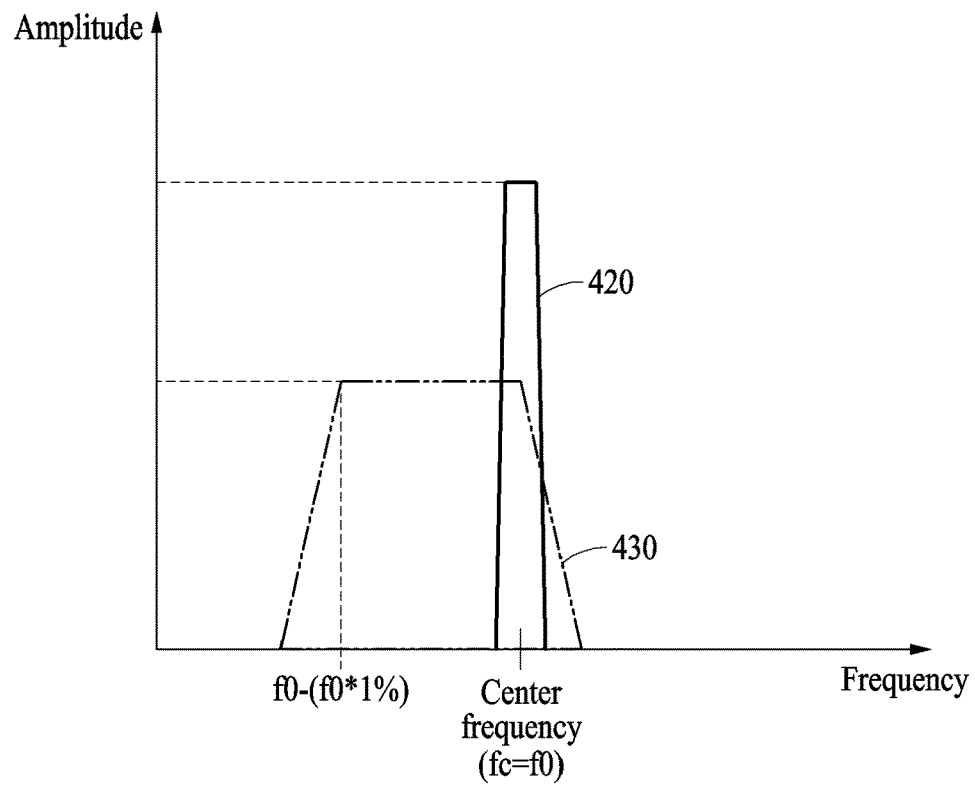
FIGS. 4A and 4B are graphs illustrating frequency band distributions according to a spread spectrum method of a spread spectrum clock signal, according to an embodiment.
Figure 4B:
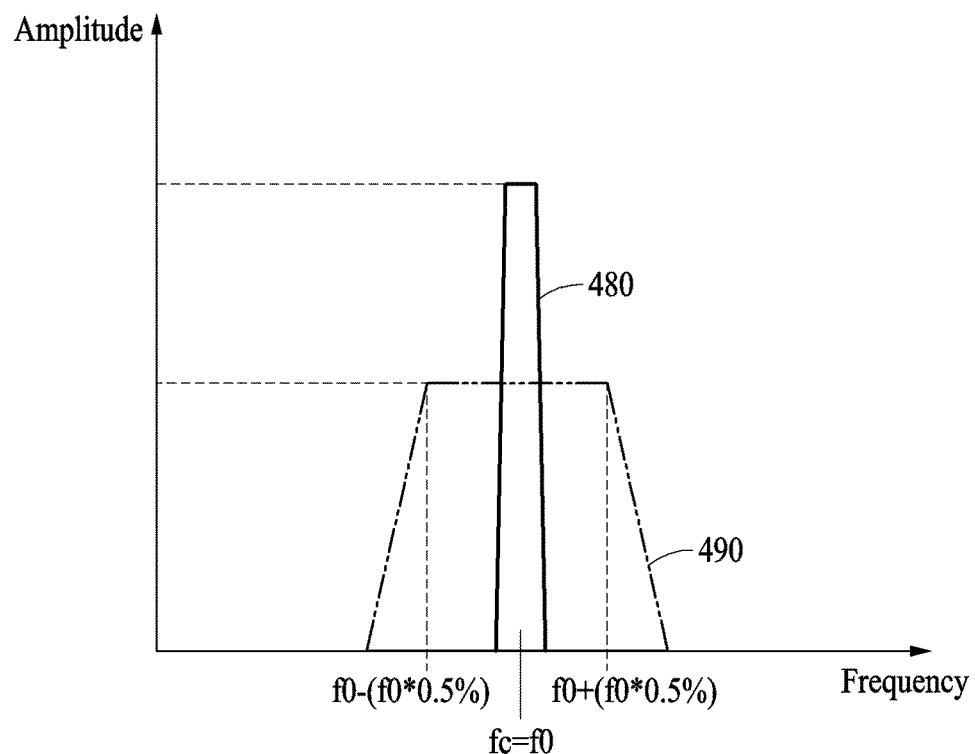

FIGS. 4A and 4B are graphs illustrating frequency band distributions according to a spread spectrum method of a spread spectrum clock signal, according to an embodiment.

FIG. 4A illustrates a frequency domain signal 420 of a clock signal to which a spread spectrum method has not been applied and a frequency domain signal 430 of a spread spectrum clock signal generated by applying the down-spread spectrum method and a spread ratio of 1%.

According to an embodiment, when the spread ratio is 1% and a center frequency is $f_0$, the frequency domain signal 430 may have a frequency band of $f_0-(f_0\times1\%)$ to $f_0$.

FIG. 4B illustrates a frequency domain signal 480 of a clock signal to which the spread spectrum method has not been applied and a frequency domain signal 490 of a spread spectrum clock signal generated by applying the center-spread spectrum method and a spread ratio of 1%.

According to an embodiment, the frequency domain signal 490 may have a frequency band of $$f_0 - \left(f_0 \times \frac{1\%}{2}\right) \text{ to } f_0 + \left(f_0 \times \frac{1\%}{2}\right).$$

Figure 5:
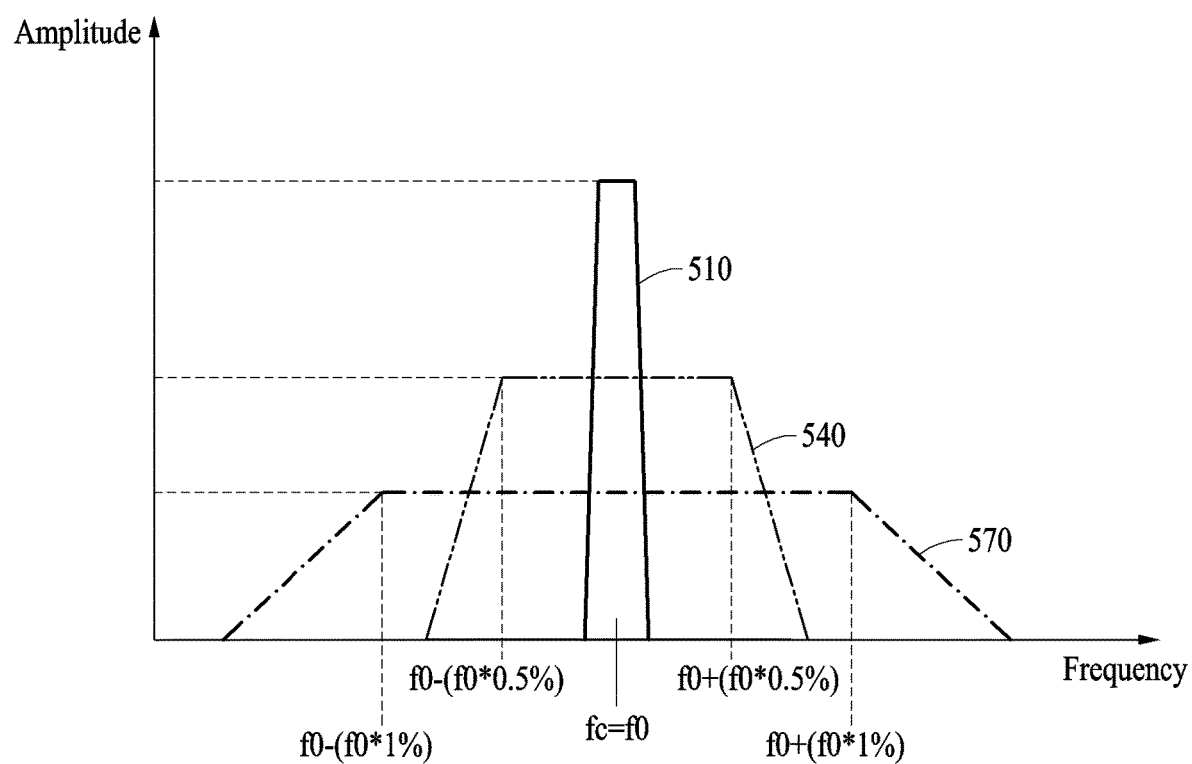
FIG. 5 is a graph illustrating frequency band distributions according to a spread ratio of a center-spread spectrum clock signal, according to an embodiment.

FIG. 5 is a graph illustrating frequency band distributions according to a spread ratio of a center-spread spectrum clock signal according to an embodiment.

According to an embodiment, as shown in FIG. 5, a signal 540 to which a spread ratio of 1% has been applied may be spread to have a frequency band expanded by 0.5%

$$\left(\text{e.g., } \frac{1\%}{2}\right)$$

of the center frequency on both sides based on the center frequency of a signal 510 to which a spread spectrum has not been applied. For example, when a center frequency $f_c$ of the signal 510 to which the spread spectrum has not been applied is $f_0$, the signal 540 to which the spread ratio of 1% has been applied may have a frequency band of $$f_0 - \left(f_0 \times \frac{1\%}{2}\right) \text{ to } f_0 + \left(f_0 \times \frac{1\%}{2}\right).$$

According to an embodiment, a signal 570 to which a spread ratio of 2% has been applied may spread a signal to have a frequency band expanded by 1%

$$\left(\text{e.g., } \frac{1\%}{2}\right)$$

of the center frequency on both sides based on the center frequency of the signal 510 to which the spread spectrum has not been applied. For example, when the center frequency $f_c$ of the signal 510 to which the spread spectrum has not been applied is $f_0$, the signal 570 to which the spread ratio of 2% has been applied may have a frequency band of $$f_0 - \left(f_0 \times \frac{2\%}{2}\right) \text{ to } f_0 + \left(f_0 \times \frac{2\%}{2}\right).$$

According to an embodiment, setting a spread ratio against an operating frequency to a maximum value supported by a communication interface (e.g., the interface 177 of FIG. 1) in a range of securing the stability of an electronic device (e.g., electronic device 101 of FIG. 1, electronic device 600 of FIG. 6) may minimize the EMI phenomenon. When the spread rate increases, a frequency in a range of the operating frequency and a multiplication frequency of the communication interface (e.g., the interface 177 of FIG. 1) to which a spread spectrum function has been applied may overlap with a channel frequency of connected communication (e.g., Wi-Fi communication or radio frequency (RF) communication). However, the communication performance of the connected communication may be degraded when the frequency in the range of the operating frequency and the multiplication frequency overlap with the communication channel frequency.

FIGS. 6 to 11 are diagrams illustrating an operation of an electronic device, according to various embodiments.

Figure 6:
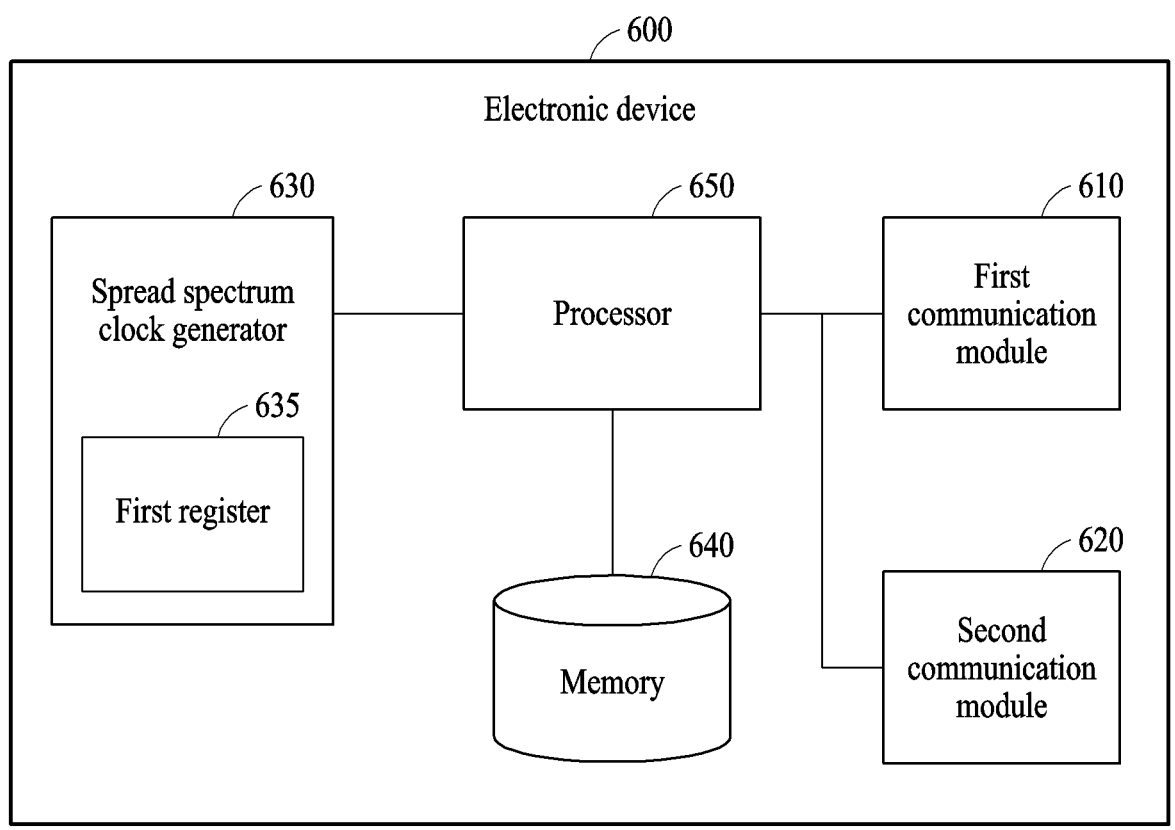

Referring to FIG. 6, an electronic device 600 may include a first communication module 610, a second communication module 620, an SSCG 630 (e.g., the SSCG 200 of FIG. 2) including a first register 635 (e.g., the spread spectrum clock modulation profile register 235), a memory 640 (e.g., the memory 130), and a processor 650 (e.g., the processor 120 of FIG. 1).

The architecture of the electronic device 600 depicted in FIG. 6 may include and/or may be similar in many respects to the architecture of the electronic device 101 and the SSCG 200 described above with reference to FIGS. 1 to 5, and may include additional features not mentioned above. Some of the elements of the electronic device 101 and the SSCG 200 described above have been omitted for the sake of simplicity. The number and arrangement of components of the electronic device 600 shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Alternatively or additionally, a set of (one or more) components shown in FIG. 6 may be integrated with each other, and/or may be implemented as an integrated circuit, as software, and/or a combination of circuits and software.

According to an embodiment, the first communication module 610 and the second communication module 620 may include or may be similar in many respects to the communication module 190 of FIG. 1. For example, the first communication module 610 may be and/or may include a Wi-Fi communication module. Alternatively or additionally, the second communication module 620 may be and/or may include an RF communication module for mobile communication (e.g., cellular networks such as legacy, 3G, 4G, LTE, 5G, and/or 5G NR).

According to an embodiment, the SSCG 630 may generate a spread spectrum clock signal for data communication of the electronic device 600. According to an embodiment, a frequency of the spread spectrum clock signal generated by the SSCG 630 may be multiplied and used for data communication of the electronic device 600. For example, the data communication may be and/or may include data communication between modules (e.g., the display module 160, the input module 150, the audio module 170, the sensor module 176, and the camera module 180 of FIG. 1) and/or electronic components (e.g., the processor 120 and the memory 130 of FIG. 1) in the electronic device 600 (e.g., the electronic device 101 of FIG. 1) or data communication with an external electronic device (e.g., the electronic device 104 of FIG. 1). However, the present disclosure is not limited in this regard. For example, the data communication may include other communication between the described modules and/or other electronic components.

According to an embodiment, the first register 635 in the SSCG 630 may include a bit value for a spread spectrum method and/or a bit value for a spread ratio. The SSCG 630 may generate the spread spectrum clock signal having a low noise peak value without overlapping with a frequency band of a channel of the first communication (e.g., the Wi-Fi communication) and/or a channel of the second communication (e.g., 3G, 4G, LTE, 5G, and/or 5G NR) as the processor 650 changes the bit value for the spread spectrum method and the bit value for the spread ratio in the first register 635. The operations of the processor 650 are described with reference to FIGS. 7 to 12.

Figure 7:
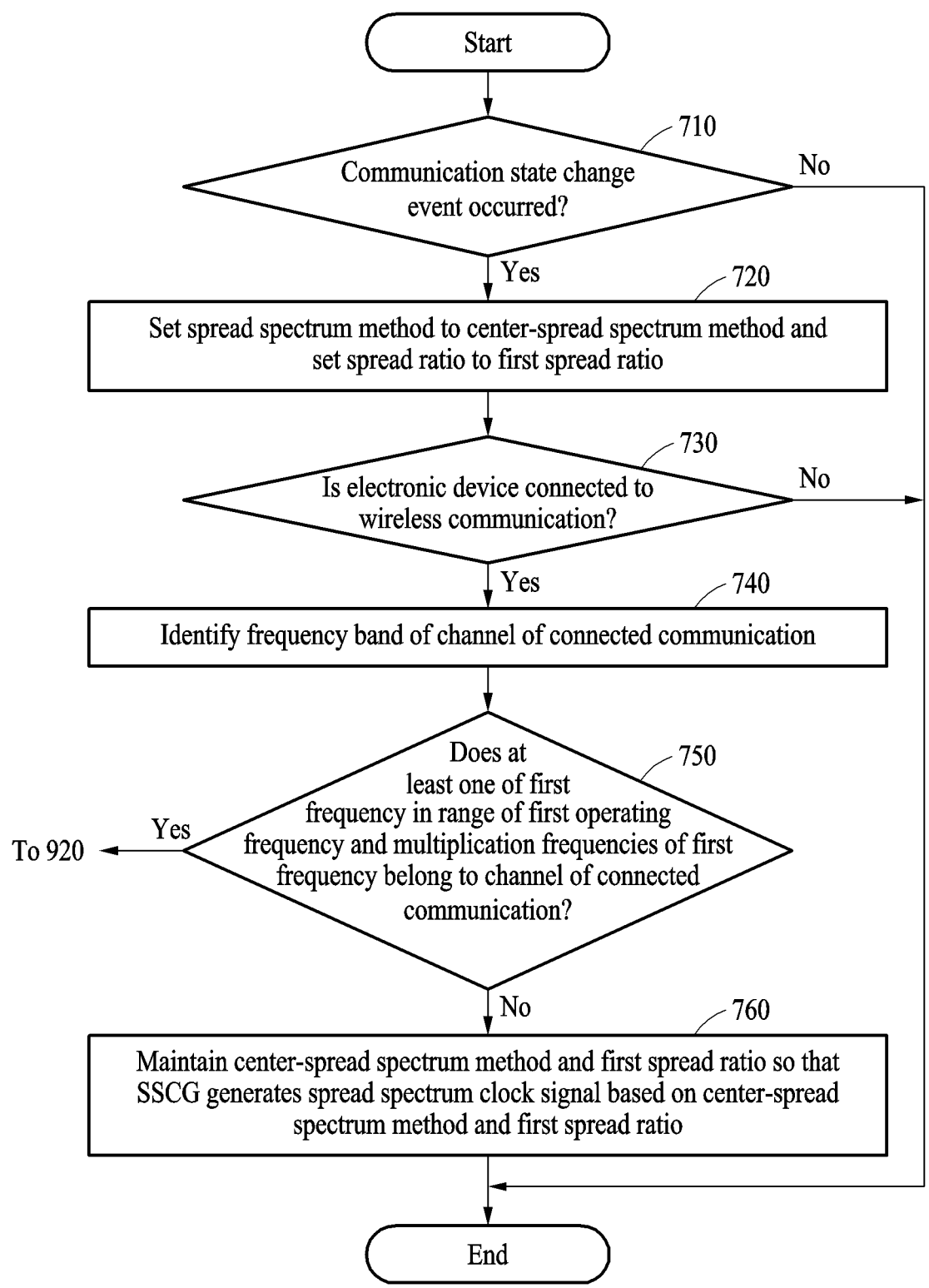

According to an embodiment, the processor 650 may perform operations 710 to 760 shown in FIG. 7.

According to an embodiment, in operation 710, the processor 650 may detect the occurrence of a communication state change event. The communication state change event may be and/or may include, for example, a case in which system power of the electronic device 600 is turned on, a case in which the electronic device 600 is connected to new communication, and/or a case in which a previously connected communication channel is changed. However, the present disclosure is not limited in this regard, and other similar communication state change events may be detected by the processor 650 in operation 710.

According to an embodiment, in operation 720, when the communication state change event occurs, the processor 650 may set the spread spectrum method to the center-spread spectrum method in the SSCG 630 and set the spread ratio to a first spread ratio (e.g., a maximum spread ratio). For example, as shown in FIG. 8, data communication 810 of the electronic device 600 may be data communication according to an SDIO interface. When the communication state change event occurs, the processor 650 may set a bit value for a spread spectrum method 830 in the first register 635 to a bit value corresponding to the center-spread spectrum method (e.g., one, "1", a value corresponding to a high level) and may set a bit value for a spread ratio 850 in the first register 635 to a bit value corresponding to the first spread ratio (e.g., 2%), such as "11", for example.

According to an embodiment, in operation 730, the processor 650 may determine whether the electronic device 600 is connected to communication through the first communication module 610 or the second communication module 620. The first communication may be and/or may include, for example, Wi-Fi communication, and the second communication may be and/or may include, for example, RF communication for mobile communication (e.g., cellular networks such as legacy, 3G, 4G, LTE, 5G, and/or 5G NR).

According to an embodiment, when the electronic device 600 is not connected to the first communication and the second communication, the processor 650 may maintain the center-spread spectrum method and the first spread ratio set to the SSCG 630. Consequently, the SSCG 630 may generate and output a spread spectrum clock signal based on the center-spread spectrum method and the first spread ratio.

According to an embodiment, in operation 740, when the electronic device 600 is connected to at least one of the first communication and the second communication, the processor 650 may identify a frequency band of a channel of the connected communication. For example, a Wi-Fi channel frequency may be obtained from a table such as Table 1 and an LTE channel frequency may be obtained from a table such as Table 2. According to an embodiment, when the connected communication channel is channel 1 of Wi-Fi 2.4 gigahertz (GHz), the processor 650 may confirm that a frequency of the communication channel connected to the electronic device 600 is 2.412 GHz with reference to Table 1.

TABLE 1

Wi-Fi Channel Frequencies

| 2.4 GHz Band (Channel - Frequency (GHz)) | 5 GHz Band (Channel - Frequency (GHz)) |
|---|---|
| 1 - 2.412 | 36 - 5.180 |
| 2 - 2.417 | 40 - 5.20 |
| 3 - 2.422 | 44 - 5.220 |
| 4 - 2.427 | 48 - 5.240 |
| 5 - 2.432 | 52 - 5.260 |
| 6 - 2.437 | 56 - 5.280 |
| 7 - 2.442 | 60 - 5.300 |
| 8 - 2.447 | 64 - 5.320 |
| 9 - 2.452 | 149 - 5.745 |
| 10 - 2.457 | 153 - 5.765 |
| 11 - 2.462 | 157 - 5.785 |
|  | 161 - 5.805 |
|  | 165 - 5.825 |

TABLE 2

LTE Channel Frequencies

| LTE Band Number | Uplink Band (MHz) | Downlink Band (MHz) |
|---|---|---|
| LTE Band 1 | 1,920-1,980 | 2,110-2,170 |
| LTE Band 2 | 1,850-1,910 | 1,930-1,990 |
| LTE Band 3 | 1,710-1,785 | 1,805-1,880 |
| LTE Band 4 | 1,710-1,755 | 2,110-2,155 |
| LTE Band 5 | 824-849 | 869-894 |
| LTE Band 6 | 830-840 | 875-885 |
| LTE Band 7 | 2,500-2,570 | 2,620-2,690 |
| LTE Band 8 | 880-915 | 925-960 |
| LTE Band 9 | 1,749.9-1,784.9 | 1,844.9-1,879.9 |
| LTE Band 10 | 1,710-1,770 | 2,110-2,170 |
| LTE Band 11 | 1,427.9-1,452.9 | 1,475.9-1,500.9 |
| LTE Band 12 | 698-716 | 728-746 |
| LTE Band 13 | 777-787 | 746-756 |
| LTE Band 14 | 788-798 | 758-768 |
| LTE Band 15 | 1,900-1,920 | 2,600-2,620 |
| LTE Band 16 | 2,010-2,025 | 2,585-2,600 |
| LTE Band 17 | 704-716 | 734-746 |
| LTE Band 18 | 815-830 | 860-875 |
| LTE Band 19 | 830-845 | 875-890 |
| LTE Band 20 | 832-862 | 791-821 |
| LTE Band 21 | 1,447.9-1,462.9 | 1,495.5-1,510.9 |
| LTE Band 22 | 3410-3,500 | 3,510-3,600 |
| LTE Band 23 | 2000-2,020 | 2,180-2,200 |

TABLE 2-continued

LTE Channel Frequencies

| LTE Band Number | Uplink Band (MHz) | Downlink Band (MHz) |
|---|---|---|
| LTE Band 24 | 1,625.5-1,660.5 | 1,525-1,559 |
| LTE Band 25 | 1,850-1,915 | 1,930-1,995 |
| LTE Band 26 | 814-849 | 859-894 |
| LTE Band 27 | 807-824 | 852-869 |
| LTE Band 28 | 703-748 | 758-803 |
| LTE Band 29 | n/a | 717-728 |
| LTE Band 30 | 2,305-2,315 | 2,350-2,360 |
| LTE Band 31 | 452.5-457.5 | 462.5-467.5 |

According to an embodiment, in operation 750, the processor 650 may determine whether a first frequency in a range of a first operating frequency and multiplication frequencies of the first frequency belong to a frequency band of a channel of connected communication.

According to an embodiment, the range of the first operating frequency may be determined according to the center frequency $f_c$, the center-spread spectrum method set to the SSCG 630, and the first spread ratio set to the SSCG 630. For example, referring to FIG. 8, the data communication 810 may be data communication according to SDIO, the center frequency may be 200 megahertz (MHz), the bit value for the spread spectrum method 830 in the first register 635 may be "1", and the bit value for the spread ratio 850 in the first register 635 may be "11" (e.g., 2%). As shown in FIG. 8, the processor 650 may determine the operating frequency range 870 of the first operating frequency 871 of 198 MHz to 202 MHz, according to $$f_c - \left(f_c \times \frac{2\%}{2}\right) \text{ to } f_c + \left(f_c \times \frac{2\%}{2}\right),$$

where $f_c$ is 200 MHz.

According to an embodiment, when a first communication module is connected to channel 1 of the 2.4 GHz band of Wi-Fi, the processor 650 may determine whether the first operating frequency in the operating frequency range of 198 MHz to 202 MHz and the multiplication frequencies of the first operating frequency belong to (e.g., comprised by) a frequency band (e.g., 2.412 GHz band) of channel 1 of the 2.4 GHz band of Wi-Fi. In an example, the processor 650 may confirm that 12 multiplication frequencies of 201 MHz in the operating frequency range of 198 MHz to 202 MHz belong to (e.g., comprised by) the frequency band of channel 1 of the 2.4 GHz band of Wi-Fi. According to another embodiment, when the first communication module is not connected to Wi-Fi and a second communication module is connected to LTE band 21, referring to Table 2, the processor 650 may confirm that the first operating frequency in the operating frequency range of 198 MHz to 202 MHz and the multiplication frequencies of the first operating frequency do not belong to (e.g., comprised by) a frequency band of LTE band 21 (e.g., uplink band of 1,447.9 MHz to 1,462.9 MHz and/or downlink band of 1,495.5 MHz to 1,510.9 MHz).

In operation 760, when the first frequency in the range of the first operating frequency and the multiplication frequencies of the first frequency do not belong to (e.g., excluded from) a frequency band of a connected wireless communication channel, the processor 650 may maintain the center-spread spectrum method and the first spread ratio set to the SSCG 630. According to an embodiment, the SSCG 630 may generate and output a spread spectrum clock signal based on the center-spread spectrum method and the first spread ratio.

According to an embodiment, a wireless communication channel 890 overlapping with at least one of a frequency in a range of an operating frequency and multiplication frequencies may be predetermined in a lookup table (e.g., the lookup table of FIG. 8) stored in the memory 640 according to the type of the data communication 810, the center frequency of the data communication 810, the spread spectrum method 830, and the spread ratio 850, for each operating frequency range 870. Referring to FIG. 8, in the case of an SDIO interface, the center frequency of 200 MHz, the spread spectrum bit value of "1" (e.g., center-spread spread spectrum method), and the spread ratio bit value of "11" (e.g., 2%), the overlapping wireless communication channel 890 may be determined as channel 1 of the 2.4 GHz band of Wi-Fi 891.

According to an embodiment, in operation 750, when the processor 650 confirms that at least one of the first frequency in the range of the first operating frequency and the multiplication frequencies of the first frequency belongs to the frequency band of the connected wireless communication channel, the processor 650 may perform operation 920.

Figure 9:
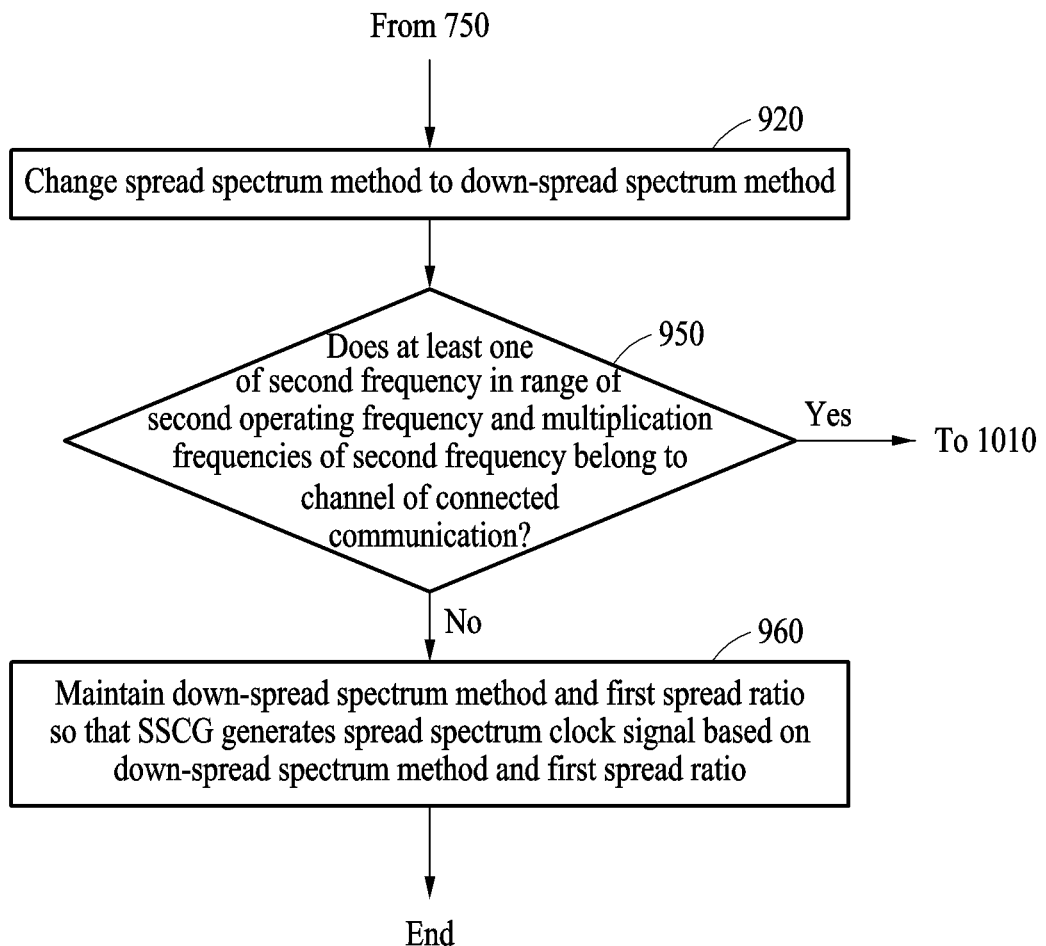

Referring to FIG. 9, in operation 920, when the processor 650 confirms that at least one of the first frequency in the range of the first operating frequency and the multiplication frequencies of the first frequency belongs to the frequency band of the connected wireless communication channel, the processor 650 may change the center-spread spectrum method set to the SSCG 630 to the down-spread spectrum method.

According to an embodiment, in operation 920, the processor 650 may change the bit value for the spread spectrum method 830 in the first register 635 from "1" (e.g., center spread) to "0" (e.g., down spread).

According to an embodiment, in operation 950, the processor 650 may determine whether at least one of a second frequency in a range of a second operating frequency and multiplication frequencies of the second frequency belongs to the frequency band of the connected wireless communication channel.

According to an embodiment, the range of the second operating frequency may be determined according to the center frequency $f_c$, the down-spread spectrum method set to the SSCG 630, and the first spread ratio set to the SSCG 630. For example, the data communication 810 may be data communication according to SDIO, the center frequency may be 200 MHz, the bit value for the spread spectrum method 830 in the first register 635 may be "0" (e.g., down spread), and the bit value for the spread ratio 850 in the first register 635 may be "11" (e.g., 2%). As shown in FIG. 8, the processor 650 may determine the range of the second operating frequency of 196 MHz to 200 MHz, according to $f_0-(f_0 \times 2\%)$ to $f_0$, where $f_0$ is 200 MHz.

According to an embodiment, in operation 960, when the second frequency in the range of the second operating frequency and the multiplication frequencies of the second frequency do not belong to (e.g., are outside of or excluded from) the frequency band of the connected wireless communication channel, the processor 650 may maintain the down-spread spectrum method and the first spread ratio set to the SSCG 630. According to an embodiment, the SSCG 630 may generate and output a spread spectrum clock signal based on the down-spread spectrum method and the first spread ratio.

According to an embodiment, in operation 950, when a first communication module is not connected to Wi-Fi and a second communication module is connected to LTE band 23, the processor 650 may confirm that 11 multiplication frequencies (2,194.5 MHz) of a frequency of 199.5 MHz in the range of the second operating frequency of 196 MHz to 200 MHz belongs to the downlink band of 2,180 MHz to 2,200 MHz of LTE band 23.

According to an embodiment, the processor 650 may perform operation 1010 when at least one of the second frequency in the range of the second operating frequency and the multiplication frequencies of the second frequency belongs to the frequency band of the connected wireless communication channel.

Figure 10:
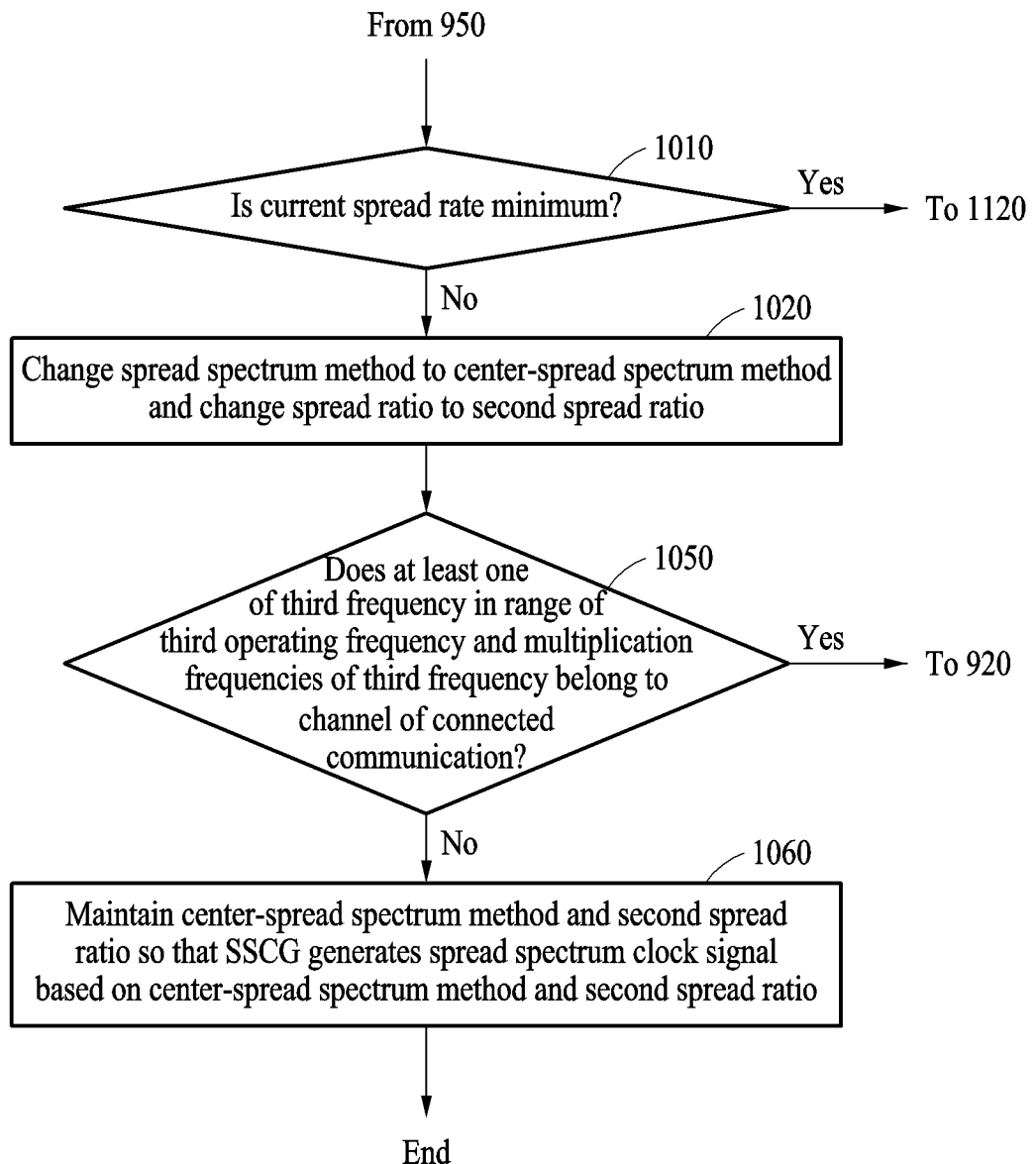
Figure 11:
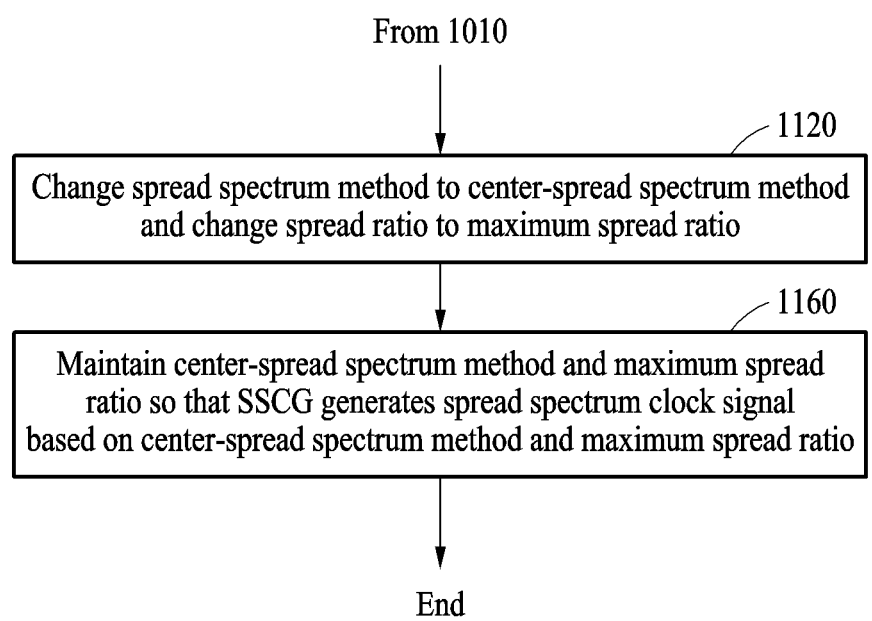

Referring to FIG. 10, in operation 1010, the processor 650 may determine whether the spread ratio set to the SSCG 630 is a minimum. According to an embodiment, when the bit value for the spread ratio 850 in the first register 635 is "11", the processor 650 may confirm that the spread ratio set to the SSCG 630 is not a minimum.

According to an embodiment, the processor 650 may perform operation 1120 when the processor 650 has confirmed that the spread ratio set to the first register 635 is a minimum spread ratio. Operation 1120 is further described with reference to FIG. 11.

According to an embodiment, in operation 1020, when the processor 650 confirms that the spread ratio set to the SSCG 630 is not a minimum, the processor 650 may change the down-spread spectrum method set to the SSCG 630 to the center-spread spectrum method and change the first spread ratio (e.g., 2%) set to the SSCG 630 to a second spread ratio (e.g., 1.5%).

According to an embodiment, the processor 650 may change the bit value for the spread spectrum method 830 of the first register 635 from "0" (e.g., down spread) to "1" (e.g., center spread) and change the bit value for the spread ratio 850 from "11" (e.g., 2%) to "10" (e.g., 1.5%).

According to an embodiment, in operation 1050, the processor 650 may determine whether at least one of a third frequency in a range of a third operating frequency and multiplication frequencies of the third frequency belongs to the frequency band of the connected wireless communication channel.

According to an embodiment, the range of the third operating frequency may be determined according to the center frequency $f_c$, the center-spread spectrum method set to the SSCG 630, and the second spread ratio (e.g., 1.5%) set to the SSCG 630. For example, the data communication 810 may be data communication according to SDIO, the center frequency may be 200 MHz, the bit value for the spread spectrum method 830 in the first register 635 may be "1" (e.g., center spread), and the bit value for the spread ratio 850 in the first register 635 may be "10" (e.g., 1.5%). As shown in FIG. 8, the processor 650 may determine the range of the third operating frequency of 198.5 MHz to 201.5 MHz according to $$f_c - \left(f_c \times \frac{1.5\%}{2}\right) \text{ to } f_c + \left(f_c \times \frac{1.5\%}{2}\right),$$

where $f_c$ is 200 MHz.

According to an embodiment, in operation 1060, when the third frequency in the range of the third operating frequency and the multiplication frequencies of the third frequency do not belong to the frequency band of the connected wireless communication channel, the processor 650 may maintain the center-spread spectrum method and the second spread ratio set to the SSCG 630. According to an embodiment, the SSCG 630 may generate and output a spread spectrum clock signal based on the center-spread spectrum method and the second spread ratio.

According to an embodiment, the processor 650 may perform operation 920 when at least one of the third frequency in the third operating frequency and the multiplication frequencies of the third frequency belongs to the frequency band of the connected wireless communication channel.

According to an embodiment, in operation 920, when at least one of the third frequency and the multiplication frequencies of the third frequency belongs to the frequency band of the connected wireless communication channel, the processor 650 may change the center-spread spectrum method set to the SSCG 630 to the down-spectrum spread method.

According to an embodiment, in operation 920, the processor 650 may change the bit value for the spread spectrum method 830 in the first register 635 from "1" (e.g., center spread) to "0" (e.g., down spread).

According to an embodiment, in operation 950, the processor 650 may determine whether at least one of a fourth frequency in a range of a fourth operating frequency and multiplication frequencies of the fourth frequency belongs to the frequency band of the connected wireless communication channel.

According to an embodiment, the range of the fourth operating frequency may be determined according to the center frequency $f_c$, the down-spread spectrum method set to the SSCG 630, and the second spread ratio set to the SSCG 630. For example, the data communication 810 may be data communication according to SDIO, the center frequency may be 200 MHz, the bit value for the spread spectrum method 830 in the first register 635 is "0" (e.g., down spread), and the bit value for the spread ratio 850 in the first register 635 may be "10" (e.g., 1.5%). As shown in FIG. 8, the processor 650 may determine the range of the fourth operating frequency of 197 MHz to 200 MHz according to $f_0-(f_0 \times 1.5\%)$ to $f_0$, where $f_0$ is 200 MHz.

According to an embodiment, in operation 960, when the fourth frequency in the range of the fourth operating frequency and the multiplication frequencies of the fourth frequency do not belong to the frequency band of the connected wireless communication channel, the processor 650 may maintain the down-spread spectrum method and the second spread ratio set to the SSCG 630. According to an embodiment, the SSCG 630 may generate and output a spread spectrum clock signal based on the down-spread spectrum method and the second spread ratio.

According to an embodiment, the processor 650 may perform operation 1010 when at least one of the fourth frequency in the range of the fourth operating frequency and the multiplication frequencies of the fourth frequency belongs to the frequency band of the connected wireless communication channel.

According to an embodiment, the processor 650 may repeat operations 1010, 1020, 1050, 920, and 950. Through this repetition, the down-spread spectrum method and the spread ratio of 0.5% may be set to the SSCG 630.

In operation 1010, the processor 650 may determine whether the spread ratio set to the SSCG 630 is a minimum. As shown in FIG. 8, since the spread ratio of 0.5% is a minimum spread ratio, the processor 650 may perform operation 1120.

According to an embodiment, in operation 1120, the processor 650 may change the down-spread spectrum method set to the SSCG 630 to the center-spread spectrum method and change the minimum spread ratio set to the SSCG 630 to a maximum spread ratio. According to an embodiment, since at least one of a frequency in a range of an operating frequency and multiplication frequencies determined according to all spread ratios supported by the center-spread spectrum method, the down-spread spectrum method, and a communication interface (e.g., the interface 177 of FIG. 1) belongs to the frequency band of the connected wireless communication, the processor 650, in operation 1120, may set the center-spread spectrum method and the maximum spread ratio to the SSCG 630.

According to an embodiment, in operation 1160, the SSCG 630 may generate and output a spread spectrum clock signal based on the center-spread spectrum method and the maximum spread ratio (e.g., a spread ratio of 2%).

Figure 12:
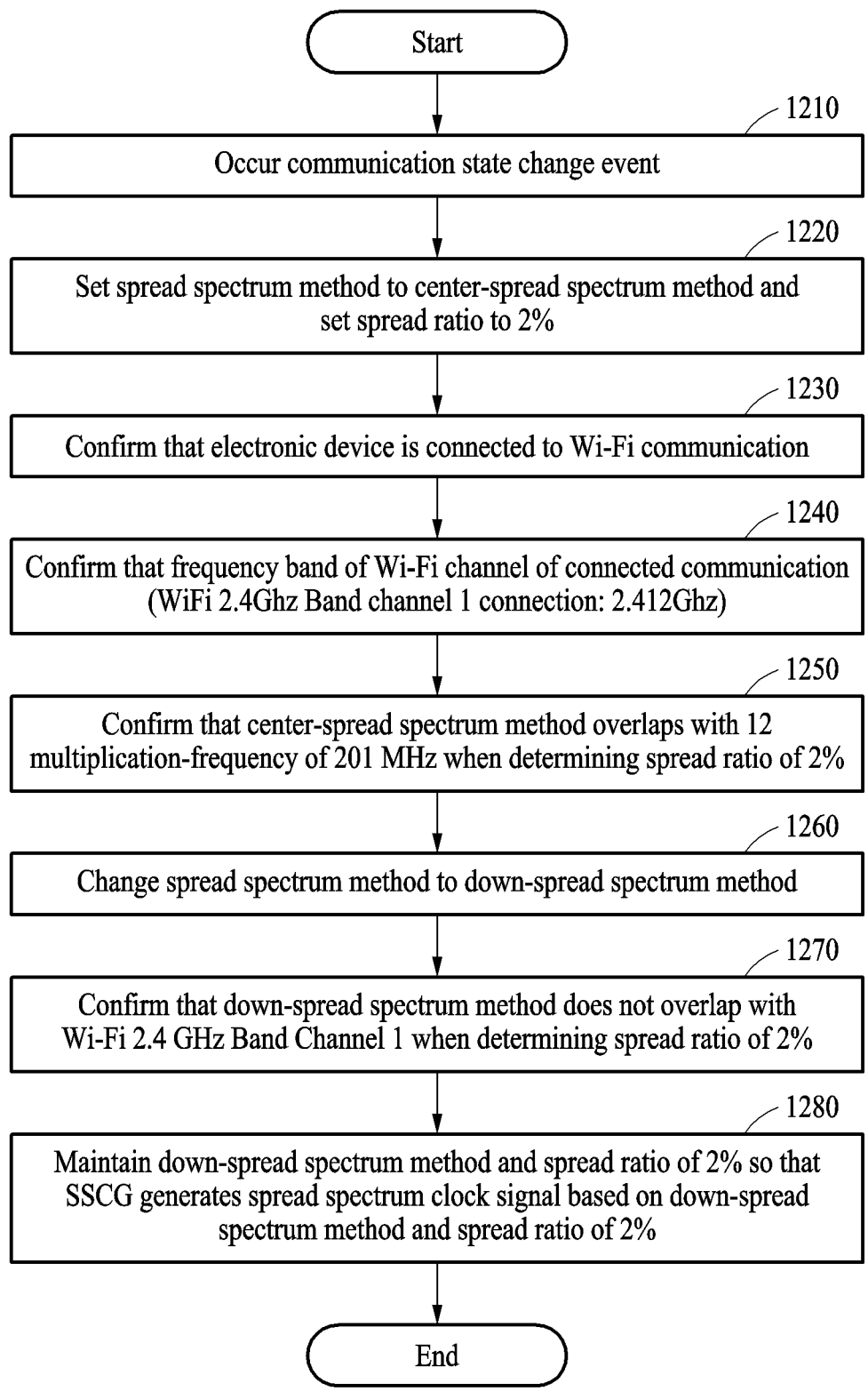
FIG. 12 is a flowchart illustrating an operating method of an electronic device.

FIG. 12 is a flowchart illustrating an example of an operating method of an electronic device, according to various embodiments.

According to an embodiment, in operation 1210, a processor (e.g., processor 120 of FIG. 1, processor 650 of FIG. 6) may detect the occurrence of a communication state change event. The communication state change event may be and/or may include, for example, a case in which system power of an electronic device (e.g., electronic device 101 of FIG. 1, electronic device 600 of FIG. 6) is turned on, a case in which an electronic device is connected to new communication, and/or a case in which a previously connected communication channel is changed. However, the present disclosure is not limited in this regard, and other similar communication state change events may be detected in operation 1210.

According to an embodiment, in operation 1220, when the communication state change event occurs, a processor (e.g., processor 120 of FIG. 1, processor 650 of FIG. 6) may set the spread spectrum method to the center-spread spectrum method in an SSCG (e.g., SSCG 630 of FIG. 6) and set the spread ratio to the first spread ratio (e.g., the maximum spread ratio). For example, as shown in FIG. 8, data communication (e.g., data communication 810 of FIG. 8) of an electronic device (e.g., electronic device 101 of FIG. 1, electronic device 600 of FIG. 6) may be data communication according to an SDIO interface. When the communication state change event occurs, a processor (e.g., processor 120 of FIG. 1, processor 650 of FIG. 6) may set a bit value (e.g., spread spectrum method 830 of FIG. 8) for the spread spectrum method in a first register (e.g., first register 635 of FIG. 6) to "1" corresponding to the center-spread spectrum method and set a bit value (e.g., spread ratio 850 of FIG. 8) for the spread ratio in the first register (e.g., first register 635 of FIG. 6) to "11" corresponding to the first spread ratio (e.g., 2%).

According to an embodiment, in operation 1230, a processor (e.g., processor 120 of FIG. 1, processor 650 of FIG. 6) may confirm that an electronic device (e.g., electronic device 101 of FIG. 1, electronic device 600 of FIG. 6) is connected to communication through a first communication module (e.g., first communication module 610 of FIG. 6) or a second communication module (e.g., second communication module 620 of FIG. 6). The first communication may be and/or may include, for example, Wi-Fi communication and the second communication may be and/or may include, for example, RF communication for mobile communication (e.g., cellular networks such as legacy, 3G, 4G, LTE, 5G, and/or 5G NR). According to an embodiment, in operation

1230, a processor (e.g., processor 120 of FIG. 1, processor 650 of FIG. 6) may confirm that an electronic device (e.g., electronic device 101 of FIG. 1, electronic device 600 of FIG. 6) is connected to Wi-Fi communication through the first communication module (e.g., first communication module 610 of FIG. 6).

According to an embodiment, in operation 1240, a processor (e.g., processor 120 of FIG. 1, processor 650 of FIG. 6) may identify a frequency band of a channel of connected communication. For example, in operation 1240, when the connected communication channel is channel 1 of the 2.4 GHz band of Wi-Fi, a processor (e.g., processor 120 of FIG. 1, processor 650 of FIG. 6) may confirm that a frequency of the communication channel connected to an electronic device (e.g., electronic device 101 of FIG. 1, electronic device 600 of FIG. 6) is 2.412 GHz with reference to Table 1.

According to an embodiment, in operation 1250, a processor (e.g., processor 120 of FIG. 1, processor 650 of FIG. 6) may determine whether the first frequency in the range of the first operating frequency and the multiplication frequencies of the first frequency belong to the frequency band of the connected communication channel. As described above, the range of the first operating frequency may be determined according to the center frequency $f_c$, the center-spread spectrum method set to an SSCG (e.g., SSCG 630 of FIG. 6), and the first spread ratio set to an SSCG (e.g., SSCG 630 of FIG. 6), and data communication (e.g., data communication 810 of FIG. 8) may be data communication according to SDIO, the center frequency may be 200 MHz, a bit value (e.g., spread spectrum method 830 of FIG. 8) for the spread spectrum method in a first register (e.g., first register 635 of FIG. 6) may be "1" (e.g., center spread) and a bit value (e.g., spread ratio 850 of FIG. 8) for the spread ratio in the first register (e.g., first register 635 of FIG. 6) may be "11" (e.g., 2%). As shown in FIG. 8, a processor (e.g., processor 120 of FIG. 1, processor 650 of FIG. 6) may determine the range of the first operating frequency of 198 MHz to 202 MHz according to $$f_c - \left(f_c \times \frac{2\%}{2}\right) \text{ to } f_c + \left(f_c \times \frac{2\%}{2}\right),$$

where $f_c$ is 200 MHz.

According to an embodiment, when a first communication module is connected to channel 1 of the 2.4 GHz band of Wi-Fi, a processor (e.g., processor 120 of FIG. 1, processor 650 of FIG. 6) may determine whether the first frequency in 198 MHz to 202 MHz and the multiplication frequencies of the first frequency belong to the frequency band (e.g., 2.412 GHz band) of channel 1 of the 2.4 GHz band of Wi-Fi. In an example, a processor (e.g., processor 120 of FIG. 1, processor 650 of FIG. 6) may confirm that 12 multiplication-frequency of 201 MHz in 198 MHz to 202 MHz belongs to the frequency band of channel 1 of the 2.4 GHz band of Wi-Fi.

According to an embodiment, in operation 1250, when a processor (e.g., processor 120 of FIG. 1, processor 650 of FIG. 6) confirms that at least one of the first frequency in the range of the first operating frequency and the multiplication frequencies of the first frequency belongs to the frequency band of the wireless communication channel, the processor (e.g., processor 120 of FIG. 1, processor 650 of FIG. 6), in operation 1260, may change the center-spread spectrum method set to an SSCG (e.g., SSCG 630 of FIG. 6) to the down-spread spectrum method.

According to an embodiment, in operation 1260, a processor (e.g., processor 120 of FIG. 1, processor 650 of FIG. 6) may change a bit value (e.g., spread spectrum method 830 of FIG. 8) for the spread spectrum method in a first register (e.g., first register 635 of FIG. 6) from "1" (e.g., center spread) to "0" (e.g., down spread).

According to an embodiment, in operation 1270, a processor (e.g., processor 120 of FIG. 1, processor 650 of FIG. 6) may determine whether at least one of the second frequency in the range of the second operating frequency and the multiplication frequencies of the second frequency belongs to the frequency band of the wireless communication channel.

According to an embodiment, as described above, the range of the second operating frequency may be determined according to the center frequency $f_c$, the down-spread spectrum method set to an SSCG (e.g., SSCG 630 of FIG. 6), and the first spread ratio set to the SSCG (e.g., SSCG 630 of FIG. 6), and data communication (e.g., data communication 810 of FIG. 8) may be data communication according to SDIO, the center frequency may be 200 MHz, a bit value (e.g., spread spectrum method 830 of FIG. 8) for the spread spectrum method in a first register (e.g., first register 635 of FIG. 6) may be "0" (e.g., down spread), and a bit value (e.g., spread ratio 850 of FIG. 8) for the spread ratio in the first register (e.g., first register 635 of FIG. 6) may be "11" (e.g., 2%). As shown in FIG. 8, a processor (e.g., processor 120 of FIG. 1, processor 650 of FIG. 6) may determine the range of the second operating frequency of 196 MHz to 200 MHz according to $f_0-(f_0 \times 2\%)$ to $f_0$, where $f_0$ is 200 MHz.

According to an embodiment, in operation 1270, a processor (e.g., processor 120 of FIG. 1, processor 650 of FIG. 6) may confirm that the second frequency in the range of the second operating frequency of 196 MHz to 200 MHz and the multiplication frequencies of the second frequency do not belong to the frequency band of channel 1 of the connected wireless communication channel of the 2.4 GHz band of Wi-Fi.

According to an embodiment, in operation 1280, when the second frequency in the range of the second operating frequency and the multiplication frequencies of the second frequency do not belong to the frequency band of the connected wireless communication channel, a processor (e.g., processor 120 of FIG. 1, processor 650 of FIG. 6) may maintain the down-spread spectrum method and the first spread ratio (e.g., 2%) set to an SSCG (e.g., SSCG 630 of FIG. 6). According to an embodiment, the SSCG (e.g., SSCG 630 of FIG. 6) may generate and output a spread spectrum clock signal based on the down-spread spectrum method and the first spread ratio.

It is to be understood that although FIGS. 6 to 12 describe embodiments relating to one data communication type (e.g., SDIO of FIG. 8), two spread spectrum methods (e.g., center spread and down spread), four spread ratios (e.g., 0.5%, 1%, 1.5%, and 2%), and two possible overlapping communications (e.g., Wi-Fi and LTE), the present disclosure is not limited in this regard. That is, the embodiments described in the present disclosure may be easily modified to include more data communication types, a different amount and type of spread spectrum methods, different spread ratio values, and additional and/or different types of possible overlapping communications, without departing from the scope of the present disclosure.

According to an embodiment, the electronic device 600 may include the first communication module 610 for the first wireless communication, the second communication module 620 for the second wireless communication, the SSCG 630 configured to generate a spread spectrum clock signal for data communication of the electronic device 600, and the processor 650.

According to an embodiment, the processor 650, when a communication state change event of the electronic device 600 occurs, may set the spread spectrum method and the spread ratio to the first spread spectrum method and the first spread ratio to the SSCG, respectively, and may determine whether the electronic device 600 is connected to the first wireless communication and the second wireless communication, when the electronic device 600 is connected to at least one of the first wireless communication and the second wireless communication, may identify the frequency band of the channel of connected wireless communication and determine whether at least one of the first frequency in the range of the first operating frequency and the multiplication frequencies of the first frequency belongs to the frequency band of the channel, and when the first frequency and the multiplication frequencies of the first frequency do not belong to the frequency band, may maintain the first spread spectrum method and the first spread ratio so that the SSCG 630 generates the spread spectrum clock signal based on the first spread spectrum method and the first spread ratio.

According to an embodiment, the range of the first operating frequency may be determined based on the center frequency of data communication, the first spread spectrum method, and the first spread ratio.

According to an embodiment, the processor 650, when at least one of the first frequency and the multiplication frequencies of the first frequency belongs to the frequency band of the connected wireless communication channel, may change the first spread spectrum method to the second spread spectrum method and determine whether at least one of the second frequency in the range of the second operating frequency and the multiplication frequencies of the second frequency belongs to the frequency band of the connected wireless communication channel.

According to an embodiment, the range of the second operating frequency may be determined based on the center frequency of data communication, the second spread spectrum method, and the first spread ratio.

According to an embodiment, when the second frequency and the multiplication frequencies of the second frequency do not belong to the frequency band of the connected wireless communication channel, the processor 650 may maintain the second spread spectrum method and the first spread ratio and the SSCG 630 may generate the spread spectrum clock signal based on the second spread spectrum method and the first spread ratio.

According to an embodiment, the processor 650, when at least one of the second frequency and the multiplication frequencies of the second frequency belongs to the frequency band of the connected wireless communication channel, may determine whether the first spread ratio is a minimum, and when the first spread ratio is not minimum, may change the second spread spectrum method to the first spread spectrum method and may change the first spread ratio to the second spread ratio.

According to an embodiment, the processor 650 may determine whether at least one of the third frequency in the range of the third operating frequency and the multiplication frequencies of the third frequency belongs to the frequency band.

According to an embodiment, the range of the third operating frequency may be determined based on the center frequency of data communication, the first spread spectrum method, and the second spread ratio.

According to an embodiment, when at least one of the third frequency and the multiplication frequencies of the third frequency belongs to the frequency band of the connected wireless communication channel, the processor 650 may change the first spread spectrum method to the second spread spectrum method and may determine whether at least one of the fourth frequency in the range of the fourth operating frequency and the multiplication frequencies of the fourth frequency belongs to the frequency band of the connected wireless communication channel.

According to an embodiment, the range of the fourth operating frequency may be determined based on the center frequency of data communication, the second spread spectrum method, and the second spread ratio.

According to an embodiment, the processor 650 may set a bit value corresponding to the first spread spectrum method and a bit value corresponding to the first spread ratio to the first register 635 in the SSCG 630.

According to an embodiment, the first wireless communication may be Wi-Fi communication and the second wireless communication may be RF communication.

According to an embodiment, the first spread spectrum method may include the spread spectrum method.

According to an embodiment, the electronic device 600 may include the first communication module 610 for the first wireless communication, the second communication module 620 for the second wireless communication, the SSCG 630 that generates the spread spectrum clock signal for data communication of the electronic device 600, the processor 650, and the memory 640.

According to an embodiment, the processor 650 may set the spread spectrum method and the spread ratio to the first spread spectrum method and the first spread ratio in the SSCG 630, respectively, when the electronic device 600 is connected to at least one of the first wireless communication and the second wireless communication, may determine whether at least one of the first frequency in the range of the first operating frequency and the multiplication frequencies of the first frequency belongs to the frequency band of the connected wireless communication channel, and when at least one of the first frequency and the multiplication frequencies of the first frequency belongs to the frequency band, may change the first spread spectrum method set to the SSCG 630 to the second spread spectrum method and may determine whether at least one of the second frequency in the range of the second operating frequency and the multiplication frequencies of the second frequency belongs to the frequency band.

According to an embodiment, the range of the first operating frequency may be determined based on the center frequency of data communication, the first spread spectrum method, and the first spread ratio.

According to an embodiment, the range of the second operating frequency may be determined based on the center frequency of data communication, the second spread spectrum method, and the first spread ratio.

According to an embodiment, the memory 640 may store a lookup table used to determine whether at least one of a frequency in a range of an operating frequency and multiplication frequencies of the frequency of a clock signal belongs to the frequency band of the connected wireless communication channel.

According to an embodiment, when at least one of the second frequency and the multiplication frequencies of the second frequency belongs to the frequency band, the processor 650 may change the second spread spectrum method to the first spread spectrum method, change the first spread ratio to the second spread ratio, and determine whether at least one of the third frequency in the range of the third operating frequency and the multiplication frequencies of the third frequency belongs to the frequency band.

According to an embodiment, the range of the third operating frequency may be determined based on the center frequency of data communication, the first spread spectrum method, and the second spread ratio.

According to an embodiment, when at least one of the third frequency and the multiplication frequencies of the third frequency belongs to the frequency band, the processor 650 may change the first spread spectrum method to the second spread spectrum method and determine whether at least one of the fourth frequency in the range of the fourth operating frequency and the multiplication frequencies of the fourth frequency belongs to the frequency band.

According to an embodiment, the range of the fourth operating frequency may be determined based on the center frequency of data communication, the second spread spectrum method, and the second spread ratio.

According to an embodiment, when the first frequency and the multiplication frequencies of the first frequency do not belong to the frequency band, the processor 650 may maintain the first spread spectrum method and the first spread ratio so that the SSCG 630 generates the spread spectrum clock signal based on the first spread spectrum method and the first spread ratio.

According to an embodiment, when the second frequency and the multiplication frequencies of the second frequency do not belong to the frequency band, the processor 650 may maintain the second spread spectrum method and the first spread ratio so that the SSCG 630 generates the spread spectrum clock signal based on the second spread spectrum method and the first spread ratio.

According to an embodiment, when the third frequency and the multiplication frequencies of the third frequency do not belong to the frequency band, the processor 650 may maintain the first spread spectrum method and the second spread ratio so that the SSCG 630 generates the spread spectrum clock signal based on the first spread spectrum method and the second spread ratio.

According to an embodiment, when the fourth frequency and the multiplication frequencies of the fourth frequency do not belong to the frequency band, the processor 650 may maintain the second spread spectrum method and the second spread ratio so that the SSCG 630 generates the spread spectrum clock signal based on the second spread spectrum method and the second spread ratio.

According to an embodiment, when the first spread ratio is a minimum spread ratio, the processor 650 may change the spread spectrum method and spread ratio to the center-spread spectrum method and the maximum spread ratio in the SSCG 630, respectively, and maintain the center-spread spectrum method and the maximum spread ratio so that the SSCG 630 generates the spread spectrum clock signal based on the center-spread spectrum method and the maximum spread ratio.

According to an embodiment, the method of operating the electronic device 600 may include operation 710 of detecting the occurrence of the communication state change event of the electronic device 600, operation 720 of setting the spread spectrum method and the spread ratio to the first spread spectrum method and the first spread ratio in the spread spectrum clock signal generator 630 for data communication of the electronic device 600, respectively, operation 730 of determining whether the electronic device 600 is connected to the first wireless communication and the second wireless communication, operation 740 of identifying the frequency band of the channel of connected wireless communication when the electronic device 600 is connected to at least one of the first communication and the second wireless communication, operation 750 of determining whether at least one of the first frequency in the range of the first operating frequency and the multiplication frequencies of the first frequency belongs to the frequency band of the connected wireless communication channel, and when the first frequency and the multiplication frequencies of the first frequency do not belong to the frequency band of the connected wireless communication channel, and operation 760 of maintaining the first spread spectrum method and the first spread ratio so that the SSCG 630 generates the spread spectrum clock signal based on the first spread spectrum method and the first spread ratio.

According to an embodiment, the range of the first operating frequency may be determined based on the center frequency of data communication, the first spread spectrum method, and the first spread ratio.

According to an embodiment, the method of operating the electronic device 600 may further include, when at least one of the first frequency and the multiplication frequencies of the first frequency belongs to the frequency band of the connected wireless communication channel, operation 920 of changing the first spread spectrum method to the second spread spectrum method and operation 950 of determining whether at least one of the second frequency in the range of the second operating frequency and the multiplication frequencies of the second frequency belongs to the frequency band of the connected wireless communication channel.

According to an embodiment, the range of the second operating frequency may be determined based on the center frequency of data communication, the second spread spectrum method, and the first spread ratio.

According to an embodiment, the method of operating the electronic device 600, when the second frequency and the multiplication frequencies of the second frequency do not belong to the frequency band, may further include operation 960 of maintaining the second spread spectrum method and the first spread ratio so that the SSCG 630 generates the spread spectrum clock signal based on the second spread spectrum method and the first spread ratio.

According to an embodiment, the method of operating the electronic device 600, when at least one of the second frequency and the multiplication frequencies of the second frequency belongs to the frequency band, may further include operation 1010 of determining whether the first spread ratio is a minimum, and when the first spread ratio is not minimum, may further include operation 1020 of changing the second spread spectrum method to the first spread spectrum method and changing the first spread ratio to the second spread ratio.

According to an embodiment, the method of operating the electronic device 600 may further include operation 1050 of determining whether at least one of the third frequency in the range of the third operating frequency and the multiplication frequencies of the third frequency belongs to the frequency band.

According to an embodiment, the range of the third operating frequency may be determined based on the center frequency of data communication, the first spread spectrum method, and the second spread ratio.

According to an embodiment, the method of operating the electronic device 600, when the third frequency and the multiplication frequencies of the third frequency do not belong to the frequency band, may further include operation 1060 of maintaining the first spread spectrum method and the second spread ratio so that the SSCG 630 generates the spread spectrum clock signal based on the first spread spectrum method and the second spread ratio.

According to an embodiment, in operation 1010 of determining whether the first spread ratio is a minimum, the method of operating the electronic device 600, when the first spread ratio is a minimum, may further include operation 1120 of changing the spread spectrum method to the center-spread spectrum method and changing the spread ratio to the maximum spread ratio.

According to an embodiment, the method of operating the electronic device 600 may further include operation 1160 of maintaining the center-spread spectrum method and the maximum spread ratio so that the SSCG 630 generates the spread spectrum clock signal based on the center-spread spectrum method and the maximum spread ratio.

While embodiments of the present disclosure has been particularly shown and described, it is to be understood that various changes in form and details may be made therein without departing from the spirit and scope of the following claims.

What is claimed is:

1. An electronic device comprising:
    a first communication module configured to perform first wireless communication;
    a second communication module configured to perform second wireless communication;
    a spread spectrum clock generator (SSCG) configured to generate a first spread spectrum clock signal for data communication of the electronic device;
    a memory storing instructions; and
    a processor operatively coupled to the memory,
    wherein the processor is configured to execute the instructions to:
        based on a communication state change event of the electronic device occurring, set a spread spectrum method of the SSCG to a first spread spectrum method, set a spread ratio of the SSCG to a first spread ratio, and determine whether the electronic device is communicatively coupled to at least one of the first wireless communication and the second wireless communication,
        based on the electronic device being communicatively coupled to the at least one of the first wireless communication and the second wireless communication, identify a frequency band of a channel of the at least one of the first wireless communication and the second wireless communication communicatively coupled to the electronic device, and determine whether at least one of a first frequency of a first operating frequency range and first multiplication frequencies of the first frequency is in the frequency band of the channel, and
        based on the first frequency and the first multiplication frequencies of the first frequency being outside the frequency band, maintain the first spread spectrum method and the first spread ratio causing the SSCG to generate the first spread spectrum clock signal based on the first spread spectrum method and the first spread ratio,
    wherein the first operating frequency range is determined based on a center frequency of the first spread spectrum clock signal, the first spread spectrum method, and the first spread ratio.

2. The electronic device of claim 1, wherein the processor is further configured to execute the instructions to:
    based on at least one of the first frequency and the first multiplication frequencies of the first frequency being in the frequency band of the channel, change the spread spectrum method of the SSCG to a second spread spectrum method and determine whether at least one of a second frequency of a second operating frequency range and second multiplication frequencies of the second frequency is in the frequency band of the channel,
    wherein the second operating frequency range is determined based on the center frequency of the first spread spectrum clock signal, the second spread spectrum method, and the first spread ratio.

3. The electronic device of claim 2, wherein the processor is further configured to execute the instructions to maintain the second spread spectrum method and the first spread ratio based on the second frequency and the second multiplication frequencies of the second frequency being outside of the frequency band, and
    wherein the SSCG is further configured to generate a second spread spectrum clock signal based on the second spread spectrum method and the first spread ratio.

4. The electronic device of claim 2, wherein the processor is further configured to execute the instructions to:
    based on the at least one of the second frequency and the second multiplication frequencies of the second frequency being in the frequency band, determine whether the first spread ratio is a minimum spread ratio, and
    based on the first spread ratio being greater than the minimum spread ratio, change the spread spectrum method of the SSCG to the first spread spectrum method and change the spread ratio of the SSCG to a second spread ratio.

5. The electronic device of claim 4, wherein the processor is further configured to execute the instructions to:
    determine whether at least one of a third frequency of a third operating frequency range and third multiplication frequencies of the third frequency is in the frequency band,
    wherein the third operating frequency range is determined based on the center frequency of the first spread spectrum clock signal, the first spread spectrum method, and the second spread ratio.

6. The electronic device of claim 5, wherein the processor is further configured to execute the instructions to:
    based on the at least one of the third frequency and the third multiplication frequencies of the third frequency being in the frequency band, change the spread spectrum method of the SSCG to the second spread spectrum method and determine whether at least one of a fourth frequency of a fourth operating frequency range and fourth multiplication frequencies of the fourth frequency is in the frequency band,
    wherein the fourth operating frequency range is determined based on the center frequency of the first spread spectrum clock signal, the second spread spectrum method, and the second spread ratio.

7. The electronic device of claim 1, wherein the processor is further configured to execute the instructions to:
    set a first bit value corresponding to the first spread spectrum method and a second bit value corresponding to the first spread ratio in a first register of the SSCG.

8. The electronic device of claim 1, wherein the first wireless communication is wireless fidelity (Wi-Fi) communication, and
 wherein the second wireless communication is radio frequency (RF) communication.

9. The electronic device of claim 1, wherein the first spread spectrum method is a center-spread spectrum method.

10. A method of operating an electronic device, the method comprising:
 based on a communication state change event of the electronic device occurring, setting a spread spectrum method of a spread spectrum clock generator (SSCG) of the electronic device to a first spread spectrum method and setting a spread ratio of the SSCG to a first spread ratio;
 determining whether the electronic device is communicatively coupled to at least one of a first wireless communication and a second wireless communication;
 based on the electronic device being communicatively coupled to the at least one of the first wireless communication and the second wireless communication, identifying a frequency band of a channel of the at least one of the first wireless communication and the second wireless communication communicatively coupled to the electronic device;
 determining whether at least one of a first frequency of a first operating frequency range and first multiplication frequencies of the first frequency is in the frequency band of the channel; and
 based on the first frequency and the first multiplication frequencies of the first frequency being outside of the frequency band, maintaining the first spread spectrum method and the first spread ratio so that the SSCG generates a first spread spectrum clock signal based on the first spread spectrum method and the first spread ratio,
 wherein the first operating frequency range is determined based on a center frequency of the first spread spectrum clock signal, the first spread spectrum method, and the first spread ratio.

11. The method of claim 10, further comprising:
 based on at least one of the first frequency and the first multiplication frequencies of the first frequency being in the frequency band of the channel, changing the spread spectrum method of the SSCG to a second spread spectrum method, and determining whether at least one of a second frequency of a second operating frequency range and second multiplication frequencies of the second frequency is in the frequency band,
 wherein the second operating frequency range is determined based on the center frequency of the first spread spectrum clock signal, the second spread spectrum method, and the first spread ratio.

12. The method of claim 11, further comprising:
 based on the second frequency and the second multiplication frequencies of the second frequency being outside the frequency band, maintaining the second spread spectrum method and the first spread ratio so that the SSCG generates a second spread spectrum clock signal based on the second spread spectrum method and the first spread ratio.

13. The method of claim 11, further comprising:
 based on the at least one of the second frequency and the second multiplication frequencies of the second frequency being in the frequency band, determining whether the first spread ratio is a minimum spread ratio; and
 based on the first spread ratio being greater than the minimum spread ratio, changing the spread spectrum method of the SSCG to the first spread spectrum method and changing the spread ratio of the SSCG to a second spread ratio.

14. The method of claim 13, further comprising:
 determining whether at least one of a third frequency of a third operating frequency range and third multiplication frequencies of the third frequency is in the frequency band,
 wherein the third operating frequency range is determined based on the center frequency of the first spread spectrum clock signal, the first spread spectrum method, and the second spread ratio.

15. The method of claim 14, further comprising:
 based on the at least one of the third frequency and the third multiplication frequencies of the third frequency being in the frequency band, changing the spread spectrum method of the SSCG to the second spread spectrum method and determining whether at least one of a fourth frequency of a fourth operating frequency range and fourth multiplication frequencies of the fourth frequency is in the frequency band,
 wherein the fourth operating frequency range is determined based on the center frequency of the first spread spectrum clock signal, the second spread spectrum method, and the second spread ratio.

16. The method of claim 10, further comprising:
 setting a first bit value corresponding to the first spread spectrum method and setting a second bit value corresponding to the first spread ratio in a first register of the SSCG.

17. The method of claim 10, wherein the first wireless communication is wireless fidelity (Wi-Fi) communication, and
 wherein the second wireless communication is radio frequency (RF) communication.

18. The method of claim 10, wherein the first spread spectrum method is a center-spread spectrum method.

19. A non-transitory computer-readable storage medium storing computer-executable instructions for performing data communication that, when executed by at least one processor of an electronic device, cause the electronic device to:
 based on a communication state change event of the electronic device occurring, set a spread spectrum method of a spread spectrum clock generator (SSCG) of the electronic device to a first spread spectrum method and set a spread ratio of the SSCG to a first spread ratio;
 determine whether the electronic device is communicatively coupled to at least one of a first wireless communication and a second wireless communication;
 based on the electronic device being communicatively coupled to the at least one of the first wireless communication and the second wireless communication, identify a frequency band of a channel of the at least one of the first wireless communication and the second wireless communication communicatively coupled to the electronic device;
 determine whether at least one of a first frequency of a first operating frequency range and first multiplication frequencies of the first frequency is in the frequency band of the channel; and based on the first frequency and the first multiplication frequencies of the first frequency being outside of the frequency band, maintain the first spread spectrum method and the first spread ratio so that the SSCG generates a first spread spectrum clock signal based on the first spread spectrum method and the first spread ratio, wherein the first operating frequency range is determined based on a center frequency of the first spread spectrum clock signal, the first spread spectrum method, and the first spread ratio.

20. The non-transitory computer-readable storage medium of claim 19, wherein the computer-executable instructions, when executed by the at least one processor, further cause the electronic device to:

based on at least one of the first frequency and the first multiplication frequencies of the first frequency being in the frequency band of the channel, change the spread spectrum method of the SSCG to a second spread spectrum method, and determine whether at least one of a second frequency of a second operating frequency range and second multiplication frequencies of the second frequency is in the frequency band, wherein the second operating frequency range is determined based on the center frequency of the first spread spectrum clock signal, the second spread spectrum method, and the first spread ratio.

* * * * *